US012631219B2

(12) United States Patent
Lindblade et al.

(10) Patent No.: US 12,631,219 B2
(45) Date of Patent: May 19, 2026

(54) COUPLERS AND MECHANICAL JOINT ASSEMBLIES INCLUDING SAME

(71) Applicant: MODEC America, Inc., Tx, TX (US)

(72) Inventors: Stephen P. Lindblade, Waller, TX (US); Jamie Clay Gamble, Erick, OK (US); Quoc Anh Dang, Cypress, TX (US)

(73) Assignee: MODEC AMERICA, INC., Houston, TX (US)

( * ) Notice: Subject to any disclaimer, the term of this patent is extended or adjusted under 35 U.S.C. 154(b) by 559 days.

(21) Appl. No.: 18/055,167

(22) Filed: Nov. 14, 2022

(65) Prior Publication Data

US 2023/0151846 A1      May 18, 2023

Related U.S. Application Data

(60) Provisional application No. 63/306,239, filed on Feb. 3, 2022, provisional application No. 63/279,420, filed on Nov. 15, 2021.

(51) Int. Cl.
F16D 3/38          (2006.01)

(52) U.S. Cl.
CPC ....... F16D 3/387 (2013.01); Y10T 403/32041 (2015.01)

(58) Field of Classification Search
CPC ... F16D 3/26; F16D 3/265; F16D 3/38; F16D 3/382; F16D 3/387; F16C 2226/62; Y10T 403/32041; Y10T 403/32049; Y10T 403/32181; Y10T 403/32221; Y10T 403/32393; Y10T 403/32861; Y10T 403/32893; Y10T 403/32918; Y10T 403/32934

USPC ........ 403/235, 316, 317, 318, 319; 464/114, 464/153

See application file for complete search history.

(56)          References Cited

U.S. PATENT DOCUMENTS

| | | | | |
|---|---|---|---|---|
| 2,342,396 A | * | 2/1944 | Goddard | F16D 3/40 |
| | | | | 403/53 |
| 2,826,052 A | | 3/1958 | Stillwagon, Jr. | |
| 2,997,320 A | * | 8/1961 | Sutherland | F16D 3/387 |
| | | | | 403/316 |
| 3,300,258 A | * | 1/1967 | Kompanek, Jr. | F16D 3/40 |
| | | | | 384/280 |

(Continued)

FOREIGN PATENT DOCUMENTS

| | | | | |
|---|---|---|---|---|
| DE | 102008015738 A1 | * | 10/2009 | F16D 3/387 |
| FR | 1356834 A | | 3/1964 | |
| WO | WO-2018197439 A1 | * | 11/2018 | F16D 3/38 |

OTHER PUBLICATIONS

International Search Report and Written Opinion for PCT/US2022/079807 dated Mar. 15, 2023.

*Primary Examiner* — Amber R Anderson
*Assistant Examiner* — Kevin J Baynes
(74) *Attorney, Agent, or Firm* — Edmonds & Cmaidalka, P.C.

(57)          ABSTRACT

A coupler configured to provide an articulated connection about two axes of rotation between a first member and a second member. The coupler can include a first end that defines a first bore therethrough and a second bore at least partially therethrough and a second end that defines a third bore therethrough. The first bore and the second bore can partially intersect one another.

24 Claims, 16 Drawing Sheets

(56)  References Cited

U.S. PATENT DOCUMENTS

| | | | | | |
|---|---|---|---|---|---|
| 4,579,477 | A * | 4/1986 | Hartman | F16D 1/0894 | 403/324 |
| 4,768,750 | A * | 9/1988 | Wilson | F16D 1/0894 | 403/324 |
| 5,062,730 | A * | 11/1991 | Tomii | F16D 3/40 | 403/57 |
| 5,324,235 | A * | 6/1994 | Tomii | F16D 1/0864 | 464/182 |
| 5,326,322 | A * | 7/1994 | Fechter | F16D 3/38 | 464/11 |
| 5,433,548 | A * | 7/1995 | Roberts | B25B 23/0014 | 81/177.85 |
| 5,458,028 | A * | 10/1995 | Cleveland, III | F16D 3/40 | 464/57 |
| 5,628,578 | A * | 5/1997 | McClanahan | F16D 3/387 | 403/57 |
| 5,660,491 | A * | 8/1997 | Roberts | B25B 23/0014 | 81/177.85 |
| 5,766,081 | A * | 6/1998 | Desmarais | F16D 3/40 | 464/134 |
| 6,287,206 | B1 * | 9/2001 | Stage | F16D 3/38 | 464/119 |
| 6,656,053 | B2 * | 12/2003 | Chang | F16C 11/00 | 464/119 |
| 6,843,579 | B2 * | 1/2005 | Chen | B25B 23/0014 | 362/199 |
| 7,762,117 | B2 * | 7/2010 | Faucher | B25B 27/10 | 403/14 |
| 8,110,731 | B1 * | 2/2012 | Chen | F16D 3/40 | 84/411 R |
| 8,151,671 | B2 * | 4/2012 | Chen | B25B 23/0014 | 464/119 |
| 8,657,694 | B2 * | 2/2014 | Horwath | F16D 3/382 | 464/136 |
| 8,920,249 | B2 * | 12/2014 | Angelo | F16D 3/26 | 464/118 |
| 9,222,520 | B2 * | 12/2015 | Cohen | F16D 3/40 | |
| 9,228,614 | B2 * | 1/2016 | Lee | F16D 3/32 | |
| 9,814,470 | B2 * | 11/2017 | Weekes | A61B 17/1631 | |
| 11,226,009 | B2 * | 1/2022 | Cymbal | F16D 1/0847 | |
| 11,739,796 | B2 * | 8/2023 | Tu | F16D 3/38 | 403/57 |
| 11,965,563 | B2 * | 4/2024 | Yu | F16D 3/40 | |
| 2006/0089202 | A1 * | 4/2006 | Losi, Jr. | F16D 3/30 | 464/114 |
| 2009/0023504 | A1 * | 1/2009 | Hu | F16D 3/385 | 464/114 |
| 2009/0036222 | A1 * | 2/2009 | Hu | F16D 3/38 | 464/118 |
| 2009/0041535 | A1 * | 2/2009 | Hu | F16D 3/40 | 403/57 |
| 2021/0301880 | A1 | 9/2021 | Su | | |
| 2022/0143790 | A1 * | 5/2022 | Gaines | B25B 23/0014 | |
| 2022/0241938 | A1 * | 8/2022 | Chen | B25B 23/0014 | |

* cited by examiner

COUPLERS AND MECHANICAL JOINT ASSEMBLIES INCLUDING SAME

CROSS-REFERENCE TO RELATED APPLICATIONS

This application claims priority to U.S. Provisional Patent Application No. 63/306,239, filed on Feb. 3, 2022, and to U.S. Provisional Patent Application No. 63/279,420, filed on Nov. 15, 2021, which are both incorporated by reference herein.

FIELD

Embodiments described generally relate to couplers configured to provide an articulated connection about two axes of rotation between a first member and a second member and to mechanical joint assemblies including same. More particularly, such embodiments relate to couplers and mechanical joint assemblies including same that can be used for connecting two members in an articulated fashion to allow rotation about two non-parallel, non-intersecting axes while transmitting axial loads, torsional loads, shear loads, or a combination thereof therebetween.

BACKGROUND

In the offshore oil and gas industry, as well as other industries, for example vehicle, construction equipment, and mining industries, it is often necessary to have two structural members mechanically linked to one another in a manner that allows articulation of one structural member relative to the other structural member about two axes that are not parallel to one another while simultaneously transmitting axial loads, shear loads, torsional loads, or a combination thereof from the first structural member to the second structural member. In the offshore oil and gas industry, u-joints are often used, for example, to connect a vessel support structure to a yoke in an offshore mooring system. U-joints have been utilized for these purposes for many years.

As the load on a u-joint increases, the size, weight, and associated cost in manufacturing the u-joint increases. Additionally, in applications where the articulation of the u-joint about one or more axes of rotation is large, for example greater than 20 degrees or 30 degrees, either while under load or in an unloaded condition, the dimensions of the u-joint components must be increased to accommodate such articulation requirement(s). In very high load applications, for example in offshore oil and gas installations, the u-joints can become very massive, e.g., up to 60 tons in some applications or even up to 300 tons in other applications. As such, when the articulation requirements of the u-joint and/or the load capacity of the u-joint is large the manufacture, transportation, installation, and/or maintenance of such u-joints can become difficult if not commercially impossible.

There is a need, therefore, for improved couplers and mechanical joint assemblies including same.

SUMMARY

Couplers and dual axis joints configured to provide an articulated connection about two axes of rotation between a first member and a second member and mechanical joint assemblies including same are provided. In some embodiments, a coupler can include a first end that defines a first bore therethrough and a second bore at least partially therethrough. The first bore and the second bore can partially intersect one another. The coupler can include a second end that defines a third bore therethrough.

In some embodiments, a dual axis joint can include a coupler, a first pin, a first wedge, an arm, a second pin and a second wedge. The coupler can include a lug disposed at a first end thereof and a pair of arms disposed at a second end thereof. The lug can define a first bore therethrough and a second bore at least partially therethrough. The first bore and the second bore defined by the lug can partially intersect one another. The pair of arms can define a pair of axially aligned bores therethrough. The first pin can be disposed within the first bore. The first pin can include an engagement surface formed on a portion of an external surface of the first pin between a first end and a second end thereof. The first wedge can be disposed within the second bore. The first wedge can include an engagement surface formed on a portion of an external surface of the first wedge between a first end and a second end thereof. The engagement surface of the first wedge can contact the engagement surface of the first pin thereby restricting relative movement between the first pin and the coupler. The arm can define a first bore therethrough and a second bore at least partially therethrough. The first bore and the second bore defined by the arm can partially intersect one another. The first bore defined by the arm and the second bore defined by the arm can be disposed toward a first end of the arm. The second pin can be disposed within the pair of axially aligned bores defined by the pair of arms of the coupler and the first bore defined by the arm The second pin can include an engagement surface formed on a portion of an external surface of the second pin between a first end and a second end thereof. The second wedge can be disposed within the second bore defined by the arm. The second wedge can include an engagement surface formed on a portion of an external surface of the second wedge between a first end and a second end thereof. The engagement surface of the second wedge can contact the engagement surface of the second pin thereby restricting relative movement between the second pin and the arm.

BRIEF DESCRIPTION OF THE DRAWINGS

The various aspects and advantages of the preferred embodiment of the present invention will become apparent to those skilled in the art upon an understanding of the following detailed description of the invention, read in light of the accompanying drawings which are made a part of this specification.

DETAILED DESCRIPTION

Figure 1:
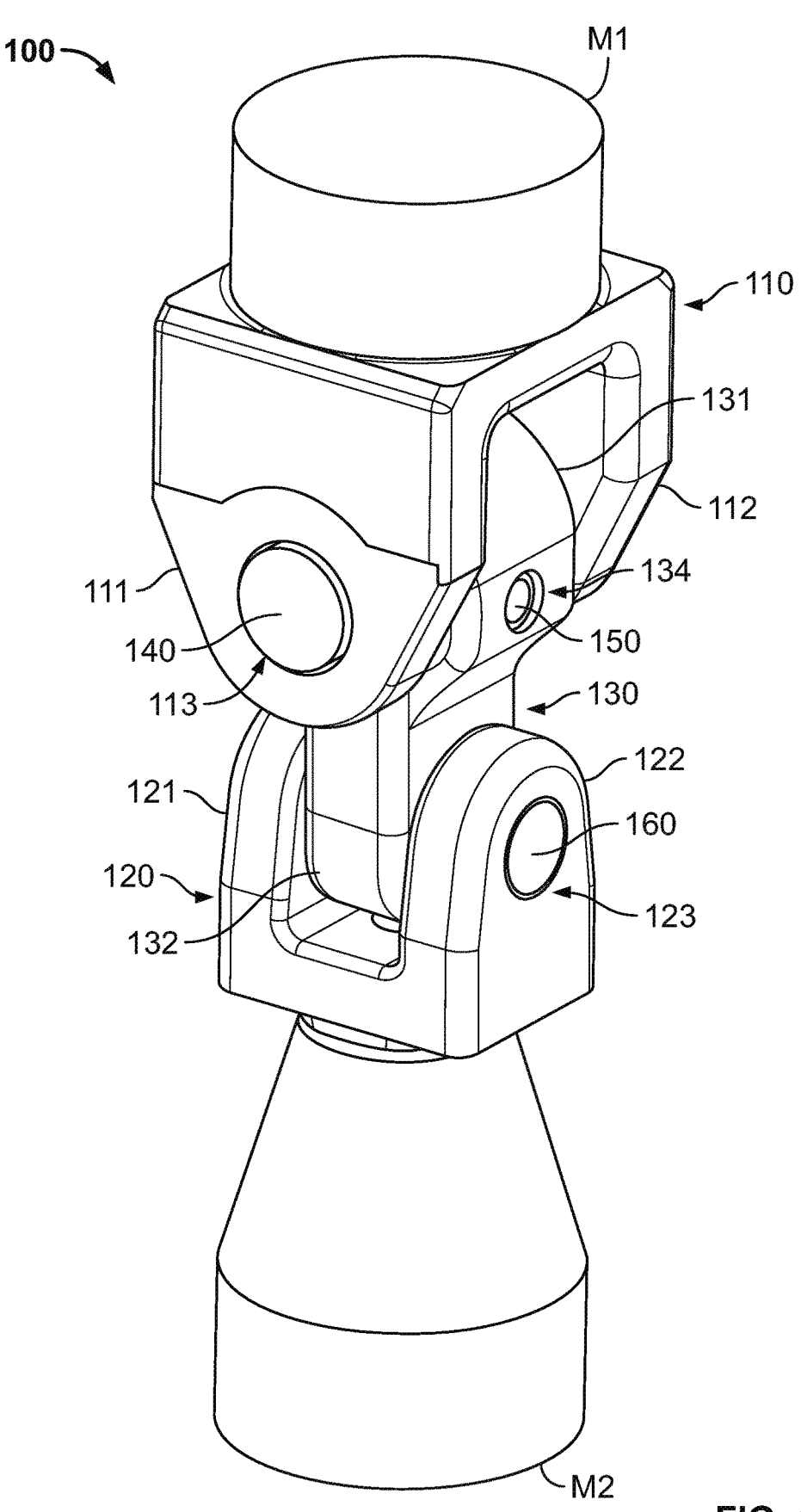
FIG. 1 depicts a perspective view of an illustrative dual axis joint connected to a first member and a second member, according to one or more embodiments described.

A detailed description will now be provided. Each of the appended claims defines a separate invention, which for infringement purposes is recognized as including equivalents to the various elements or limitations specified in the claims. Depending on the context, all references to the "invention", in some cases, refer to certain specific or preferred embodiments only. In other cases, references to the "invention" refer to subject matter recited in one or more, but not necessarily all, of the claims. It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the figures provided herein. This repetition is for the purpose of simplicity and clarity and does not in itself dictate a relationship between the various exemplary embodiments and/or configurations discussed in the Figures. Moreover, the formation of a first feature over or on a second feature in the description that follows includes embodiments in which the first and second features are formed in direct contact and also includes embodiments in which additional features are formed interposing the first and second features, such that the first and second features are not in direct contact. The exemplary embodiments presented below may be combined in any combination of ways, i.e., any element from one exemplary embodiment may be used in any other exemplary embodiment, without departing from the scope of the disclosure. The figures are not necessarily drawn to scale and certain features and certain views of the figures can be shown exaggerated in scale or in schematic for clarity and/or conciseness.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Also, the naming convention used herein is not intended to distinguish between components that differ in name but not function. Furthermore, in the following discussion and in the claims, the terms "including" and "comprising" are used in an open-ended fashion, and thus should be interpreted to mean "including, but not limited to."

All numerical values in this disclosure are exact or approximate values ("about") unless otherwise specifically stated. Accordingly, various embodiments of the disclosure may deviate from the numbers, values, and ranges disclosed herein without departing from the intended scope.

Further, the term "or" is intended to encompass both exclusive and inclusive cases, i.e., "A or B" is intended to be synonymous with "at least one of A and B," unless otherwise expressly specified herein. The indefinite articles "a" and "an" refer to both singular forms (i.e., "one") and plural referents (i.e., one or more) unless the context clearly dictates otherwise. The terms "up" and "down"; "upward" and "downward"; "upper" and "lower"; "upwardly" and "downwardly"; "above" and "below"; and other like terms used herein refer to relative positions to one another and are not intended to denote a particular spatial orientation since the apparatus and methods of using the same may be equally effective at various angles or orientations.

It should also be understood that the phrases "disposed therein", "disposed within" and other similar phrases, when describing a component, e.g., a wedge or pin, describe the component as being partially disposed therein/within or completely disposed therein/within. For example, if the component is a wedge that can be disposed within a bore, the phrase "the wedge can be disposed within the bore" means the wedge can be disposed partially within the bore or completely within the bore.

It should be understood that the terms "orthogonal" and "orthogonally" refer to two lines or vectors that are not coplanar and therefore do not intersect but can appear to be perpendicular when viewed from a particular angle. Said another way and according to a mathematical definition, two lines or vectors are orthogonal if their vector dot product is zero. For example, in a three-dimensional cartesian coordinate system, a line parallel to the X-axis with a constant Z-value of 1 is orthogonal to a line parallel to the Y-axis with a constant Z-value of 2 because these lines will not intersect, their dot product is zero, and the lines are orientated at 90 degrees with respect to one another when viewed along the Z-axis. As yet another example of a first line being orthogonal to a second line, the first line can lie in a first plane and the second line can lie in a second plane, where the first and second planes are parallel with respect to one another and the first line and the second line are oriented at 90 degrees with respect to one another when viewed along an axis that is normal to the first and second planes. Further is should be understood that the term "substantially" when used in the context of "substantially orthogonal" means the first and second line are orientated at angles of about 80 degrees, about 83 degrees, about 85 degrees, about 87 degrees, or about 89 degrees to, about 91 degrees, about 93 degrees, about 95 degrees, about 97 degrees, or about 100 degrees with respect to one another when viewed along an axis that is normal to the first and second planes.

Figure 2:
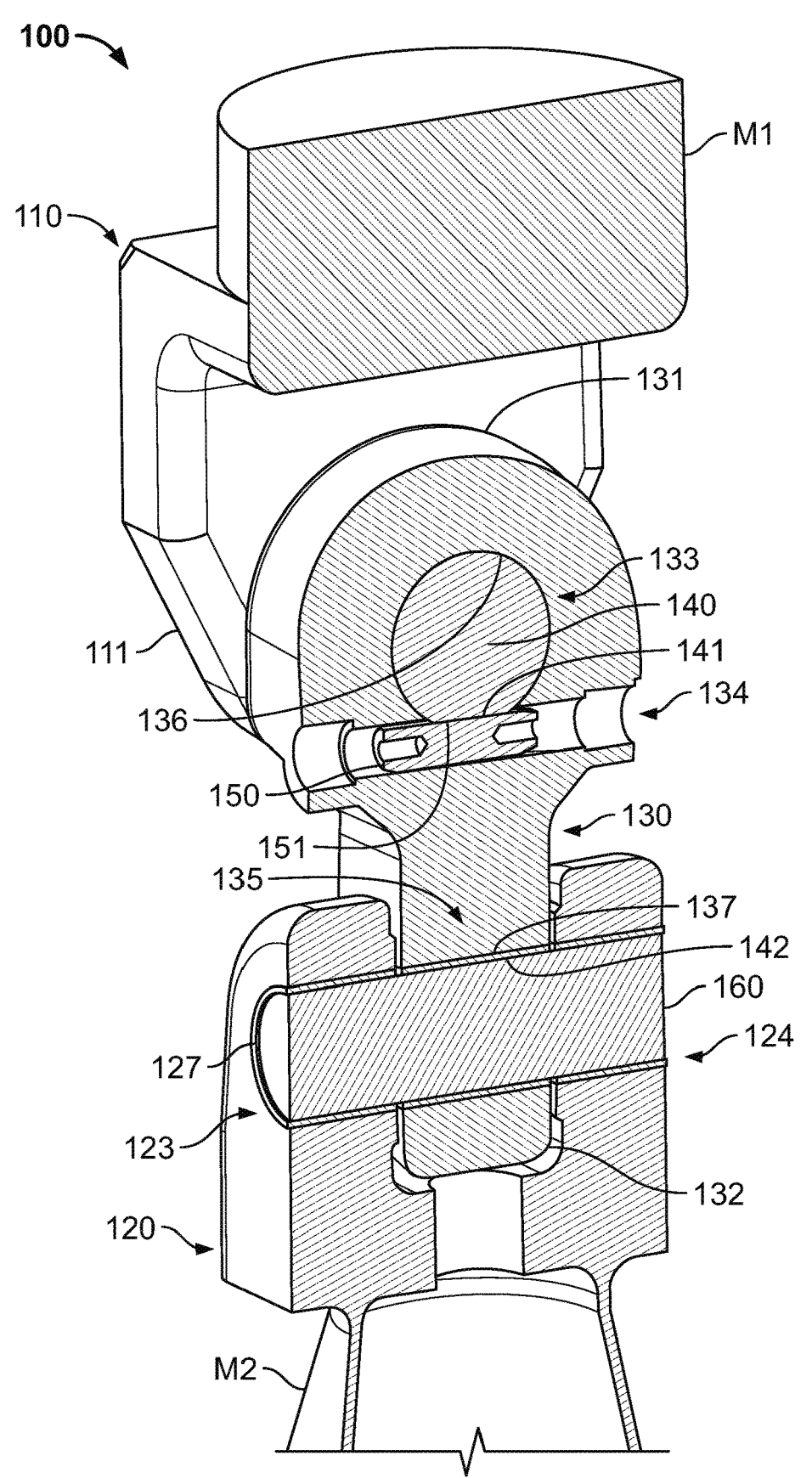
FIG. 2 depicts a partial cross-sectional view of the dual axis joint shown in FIG. 1.

FIG. 1 depicts a perspective view of an illustrative dual axis joint 100 connected to a first member M1 and a second member M2, according to one or more embodiments. FIG. 2 depicts a partial cross-sectional view of the dual axis joint 100 shown in FIG. 1. The dual axis joint 100 can include a first clevis 110, a second clevis 120, a coupler 130, a first pin 140, a wedge 150, and a second pin 160. The dual axis joint 100 can allow for articulation of the first member M1 relative to the second member M2 about two non-parallel, non-intersecting axes while transmitting axial forces, shear forces, torque, or a combination thereof from the first member M1 to the second member M2 and/or from the second member M2 to the first member M1.

The first clevis 110 can be joined, fastened, or otherwise connected to the first member M1 and the second clevis 120 can be joined, fastened, or otherwise connected to the second member M2. In some embodiments, the connection between the first clevis 110 and the first member M1 and the connection between the second clevis 120 and the second member M2 can be static such that the first clevis 110 does not move with respect to M1 and the second clevis 120 does not move with respect to M2. Suitable connection systems or methods can include, but are not limited to, welding, bolts, bolts and nuts, rivets, pins, screws, mechanical connectors such as a collet connector, adhesives, or the like.

The first clevis 110 can include a first pair of arms 111, 112. The first pair of arms 111, 112 can define axially aligned cylindrical bores at least partially therethrough (bore 113 is visible in FIG. 1). In some embodiments, one of the bores defined by the first pair of arms 111, 112 can be completely therethrough and one of the bores defined by the first pair of arms 111, 112 can be partially disposed therethrough. In other embodiments, the bores defined by the first pair of arms 111, 112 can be completely therethrough. The second clevis 120 can include a second pair of arms 121, 122. The second pair of arms 121, 122 can define axially aligned cylindrical bores at least partially therethrough (bore 123 is visible in FIG. 1, bores 123 and 124 are visible in FIG. 2). In some embodiments, one of the bores defined by the second pair of arms 121, 122 can be completely therethrough and one of the bores defined by the second pair of arms 123, 124 can be partially therethrough. In other embodiments, the bores defined by the second pair of arms 121, 122 can be completely therethrough.

The coupler 130 and the first and second pins 140, 160 can be or otherwise provide a structural connection or linkage between the first clevis 110 and the second clevis 120. The coupler 130 can define at least a first bore 133, a second bore 134, and a third bore 135. In some embodiments, the first bore 133 and the third bore 135 defined by the coupler 130 can each be completely therethrough and the second bore 134 defined by the coupler 130 can be partially therethrough. In other embodiments, the first bore 133, the second bore 134, and the third bore 135 defined by the coupler 130 can each be completely therethrough.

In some embodiments, the coupler 130 can include a first lug 131 disposed toward a first end of the coupler 130 and a second lug 132 disposed toward a second end of the coupler 130. The first lug 131 can define the first bore 133 and the second bore 134 and the second lug 132 can define the third bore 135 (see also FIG. 5). The first bore 133 and the second bore 134 defined by the first lug 131 can partially intersect one another. The coupler 130 can be connected to the first clevis 110 by placing, locating, or otherwise disposing the first pin 140 within the first bore 133 and the bores defined by the first pair of arms 111, 112 of the first clevis 110. The coupler 130 can be connected to the second clevis 120 by placing, locating, or otherwise disposing the second pin 160 within the third bore 135 and the bores defined by the second pair of arms 121, 122 of the second clevis 120. When in use, one or more forces on the dual axis joint 100 can be transmitted between the first clevis 110 and the coupler 130 through the first pin 140. Similarly, when in use, one or more forces on the dual axis joint 100 can be transmitted between the second clevis 120 and the coupler 130 through the second pin 160. In some embodiments, the first bore 133 and the third bore 135 can be substantially orthogonal to one another. In some embodiments, the first bore 133 and the second bore 134 can be substantially orthogonal to one another.

The wedge 150 can be disposed within the second bore 134 defined by the coupler 130. As shown in FIG. 2, the first bore 133 and the second bore 134 can be arranged or configured such that the wedge 150 and the first pin 140 can contact one another. For example, the first pin 140 can include an engagement surface 141 (see FIG. 3) formed on a portion of an external surface thereof and the wedge 150 can include an engagement surface 151 (see FIG. 4) formed on an external surface thereof such that the engagement surface 141 of the first pin 140 and the engagement surface 151 of the wedge 150 can at least partially contact one another to restrict relative movement between the first pin 140 and the coupler 130. In some embodiments, the contact between the engagement surface 151 of the wedge 150 and the engagement surface 141 of the first pin 140 can restrict or prevent relative rotation between the first pin 140 and the coupler 130.

Figure 3:
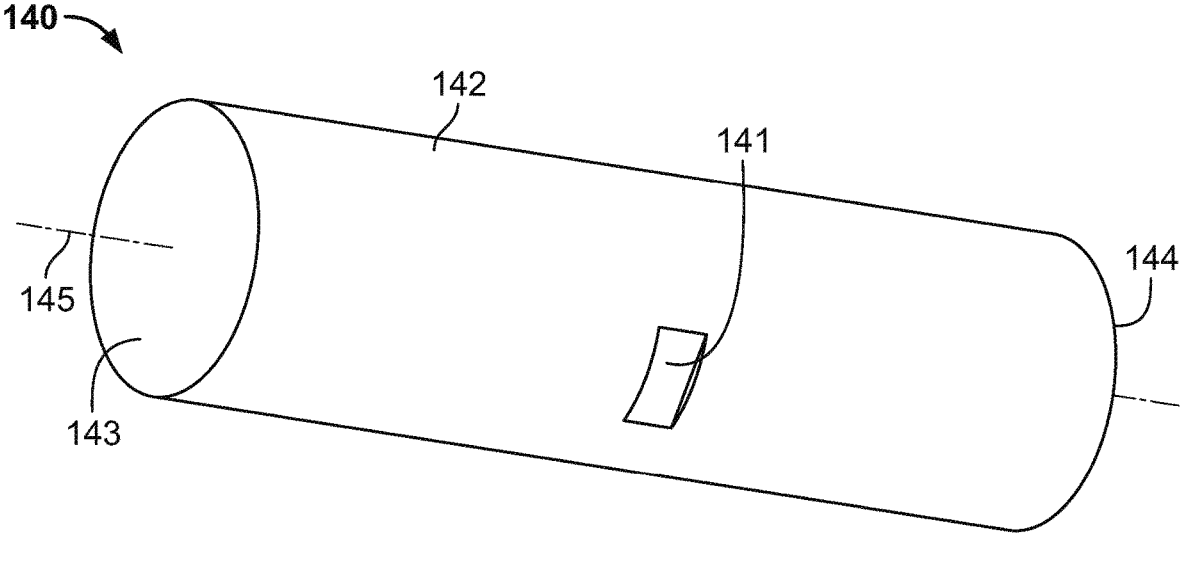
FIG. 3 depicts a perspective view of an illustrative pin having an engagement surface formed on a portion of an external surface thereof between a first end and a second end of the pin, according to one or more embodiments described.

FIG. 3 depicts a perspective view of the first pin 140 that shows the engagement surface 141 formed on a portion of the external surface 142 thereof between a first end 143 and a second end 144 of the first pin 140, according to one or more embodiments. In some embodiments, the first pin 140 can be an elongated member that can include a substantially cylindrical body. In some embodiments, the engagement surface 141 formed on the first pin 140 can be oriented substantially perpendicular to a longitudinal axis 145 of the first pin 140. In some embodiments, the engagement surface 141 of the first pin 140 can be defined by a groove, channel, depression, recess, or any other shape. As shown in FIG. 3, in some embodiments, the engagement surface 141 of the first in 140 can be flat. As shown in FIG. 3, the engagement surface 141 can be located or otherwise positioned at a midpoint of the first pin 140. In other embodiments, however, the engagement surface 141 can be located or otherwise positioned at a location that can be offset from the midpoint. As further described below, in some embodiments, the first pin 140 can include two or more engagement surfaces 141 and, in such embodiment, the two or more engagement surfaces 141 can be equally spaced or non-equally spaced apart from one another between the first end 143 and the second end 144 of the first pin 140. In some embodiments, when the first pin 140 includes two or more engagement surfaces 141, the coupler 130 can define two or more "second" bores 134 at least partially therethrough that can each be configured to receive a wedge 150 therein. It should be understood, in some embodiments, the second pin 160 can be the same or substantially the same as the first pin 140. For example, as further described below, in some embodiments, the second pin 160 can optionally include one or more engagement surfaces that can be the same or similar to the engagement surface 141 of the first pin 140. In other embodiments, however, the second pin 160 can be free of any engagement surface such that the second pin 160 can be a substantially cylindrical body without any engagement surface formed on an outer surface thereof.

Figure 4:
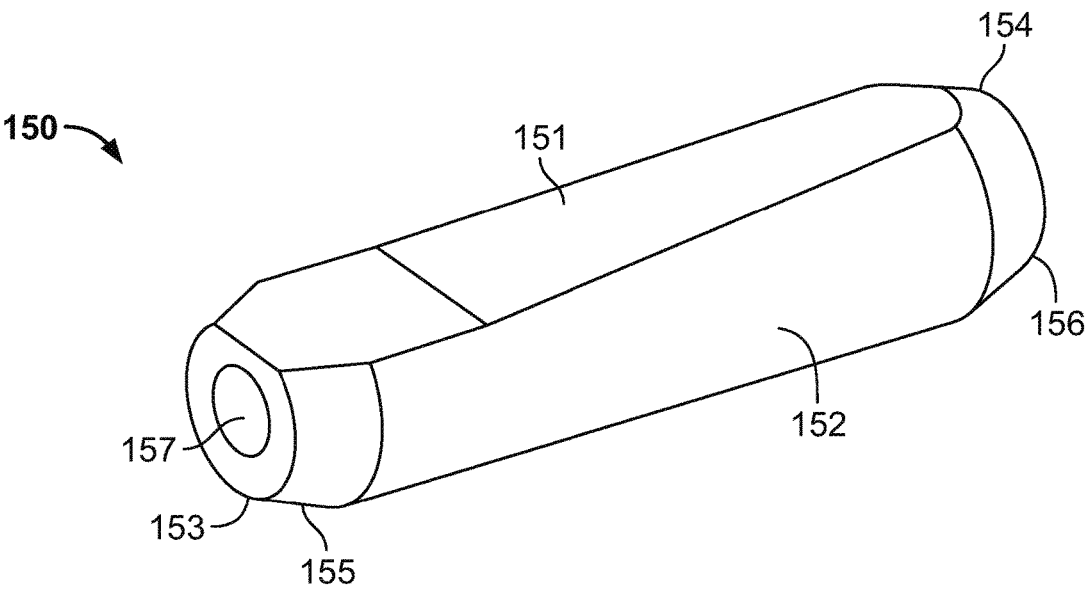
FIG. 4 depicts a perspective view of an illustrative wedge having an engagement surface formed on a portion of an external surface thereof between a first end and a second end of the wedge, according to one or more embodiments described.

FIG. 4 depicts a perspective view of the wedge 150 and shows the engagement surface 151 formed on a portion of the external or outer surface 152 thereof between a first end 153 and a second end 154 of the wedge 150, according to one or more embodiments. In some embodiments, the engagement surface 151 of the wedge 150 can be flat. In some embodiments, a thickness of a first end 153 of the wedge 150 can be less than a thickness of a second end 154 of the wedge 150 such that the engagement surface 151 can be tapered along a longitudinal axis of the wedge 150.

In some embodiments, the body of the wedge 150 can be configured as having a generally cylindrical or cuboidal body, a generally cylindrical or cuboidal body with one or two generally frusto-conical ends, or a generally cylindrical or cuboidal body with one or two generally frusto-pyramidal ends, or a combination thereof. As such, in some embodiments, the wedge 150, can include a taper or chamfer 155, 156 (two are shown) on one or both ends 153, 154 that can facilitate insertion of the wedge 150 into the second bore 134 and extraction of the wedge out of the second bore 134. In some embodiments, the wedge 150 can define a threaded bore 157 at one or both ends thereof to facilitate the insertion, preloading, retention, and/or extraction of the wedge 150 within the second bore 134. In some embodiments, the wedge 150 can define a single threaded bore that can span the entire length of the wedge 150.

In some embodiments, the wedge 150 can be positioned within the second bore 134 with a sufficient amount of axial force applied to the first end of the wedge 150, the second end 153 of the wedge 150, or both ends 153, 154 of the wedge 150 to force or otherwise urge the engagement surface 151 of the wedge 150 into contact with the engagement surface 141 of the first pin 140 and to secure the first pin 140 and the wedge 150 within the coupler 130. The force can be applied via any number of ways including a tension or jack screw mechanism, a hydraulic cylinder, impact force, or other similar means. It has been found that by applying a sufficient amount of axial force to the wedge 150, the need for a sleeve, shim, or other bushing between an outer surface of the first pin 140 and an inner surface 136 of the first bore 133 can be eliminated. As used herein, the term "bushing"

refers to any sleeve, shim, liner, inlay, pad, or any other structure configured to reduce friction and/or wear between an outer surface of a pin and an inner surface of a bore the pin is at least partially disposed within. Said another way, by applying a sufficient amount of axial force to the wedge 150 the outer surface 142 of the first pin 140 and an inner surface 136 of the first bore 133 can be in direct contact with one another. In other embodiments, however, a bushing can be disposed between the outer surface 142 of the first pin 140 and the inner surface 136 of the first bore 133 of the coupler 130. In some other embodiments, a bushing 127 can be disposed between the outer surface 142 of the second pin 160 and the inner surface of the bores of the second pair of arms 121, 122 and the inner surface 137 of the third bore 135. In still other embodiments, a bushing can be disposed between an inner surface of each arm of the first pair of arms 111, 112 and the first pin 140. The bushings can be manufactured from bronze, brass, a polymer, a fiber reinforced composite material, or any other suitable material.

While FIGS. 2-4 depict the engagement surfaces 141 and 151 of the first pin 140 and the wedge 150, respectively, as being flat, it should be understood that the engagement surfaces 141 and 151 can include any desired surface contour(s) that can be configured to contact or otherwise engage one another when the first pin 140 is disposed within the first bore 133 and the wedge 150 is disposed within the second bore 134. In some embodiments, the engagement surfaces 141 and/or 151 can include one or more surface modifications disposed thereon to facilitate or improve contact therebetween when the engagement surfaces 141 and 151 are placed in contact with one another. Illustrative surface modifications can include, but are not limited to, one or more dimples, protrusions, projections, protuberances, ridges, pins, rods, depressions, grooves, holes, notches, recesses, or any other surface variation or modification, either alone or in any combination.

In one embodiment, the engagement surface 151 of the wedge 150 can include a raised curved surface, e.g., a surface having a circular or semi-circular cross-sectional profile, disposed at least partially along the longitudinal axis of the wedge 150 and the engagement surface 141 of the first pin 140 can include a recessed curved surface, e.g., a surface having a circular or semi-circular cross-sectional profile, disposed at least partially along a longitudinal axis of the engagement surface 141 such that the raised curved surface of the wedge 150 is configured to be located at least partially within the recessed curved surface of the first pin 140.

As noted above, in some embodiments, in addition to the wedge 150 that can be disposed within the second bore 134 defined by the first coupler 130, one or more additional "second" bores can be defined by the coupler 130. In such embodiments, the dual axis joint 100 can further include one or more additional wedges that can be disposed within the one or more additional second bores and can be configured to contact the first pin 140 that can include one or more additional engagement surfaces configured to contact the additional wedge(s) in the same or different manner as the engagement surface 151 of the wedge 150 and the engagement surface 141 of the first pin 140 can be configured to contact one another. In some embodiments, when the coupler 130 defines one or more additional bores such that the dual axis joint 100 includes two or more wedges, the engagement surfaces of the two or more wedges and the engagement surfaces of the first pin 140 can include the same contour or surface profiles or different contour or surface profiles with respect to one another.

Returning to FIGS. 1 and 2, the pair of arms 111, 112 of the first clevis 110 can be configured to fit around, on either side of, or otherwise about an exterior of the first lug 131 of the coupler 130 in such a way as to allow rotation of the first clevis 110 relative to the coupler 130 when the first pin 140 is disposed within the bores of the first pair of arms 111, 112 of the first clevis 110 and the first bore 133 of the coupler 130. In some embodiments, the first clevis 110 can be configured to rotate any desired range about the first pin 140 with respect to the coupler 130. The pair of arms of the second clevis 121, 122 can be configured to fit around, on either side of, or otherwise about an exterior of the second lug 132 in such a way as to allow rotation of the second clevis 120 relative to the coupler 130 when the second pin 160 is disposed within the bores of the second pair of arms 121, 122 of the second clevis 120 and the third bore 135 of the coupler 130.

In some embodiments, the first member M1 can rotate relative to the coupler 130 about the first pin 140 up to about plus or minus 10 degrees, about plus or minus 25 degrees, about plus or minus 40 degrees, about plus or minus 60 degrees, or about plus or minus 100 degrees and the second member M2 can rotate relative to the coupler 130 about the second pin 160 about plus or minus 10 degrees, about plus or minus 25 degrees, about plus or minus 40 degrees, about plus or minus 60 degrees, or about plus or minus 100 degrees while transmitting loads from the first member M1 to the second member M2 and/or from the second member M2 to the first member M1. In some embodiments, the first member M1 can rotate relative to the coupler 130 about the first pin 140 up to about plus or minus 90 degrees, about plus or minus 120 degrees, about plus or minus 135 degrees, about plus or minus 170 degrees, and the second member M2 can rotate relative to the coupler 130 about the second pin 160 up to about plus or minus 90 degrees, about plus or minus 120 degrees, about plus or minus 135 degrees, or about plus or minus 170 degrees while in an unloaded or stored condition.

In some embodiments, the first clevis 110, the second clevis 120, the coupler 130, the first pin 140, the wedge 150, the second pin 160, and any other component(s) of the dual axis joint 100 can be fabricated or otherwise made from any suitable material or combination of materials. In some embodiments, one or more of the components of the dual axis joint 100 can be made via any suitable manufacturing process such as forging, casting, molding, milling, machining, or other process. In some embodiments, suitable materials can be or can include, but are not limited to, metal, metal alloys, non-metallic materials, or any other material that is appropriate for the loading, service, and environment that the dual axis joint 100 may be subjected to during use thereof. Suitable metals and metal alloys can be or can include, but are not limited to, steel, carbon steel, stainless steel, aluminum, nickel, bronze, brass, titanium, or any combination thereof. In some embodiments, suitable non-metallic materials can be or can include, but are not limited to, carbon fiber, fiberglass, polymers, reinforced polymers, or any other non-metallic material(s) that have suitable mechanical properties for a give application. The overall dimensions and shape of the first clevis 110, second clevis 140 and the coupler 130 can be selected to accommodate various angular rotations and loadings required of the dual axis joint as will be apparent to those skilled in the art.

Figure 5:
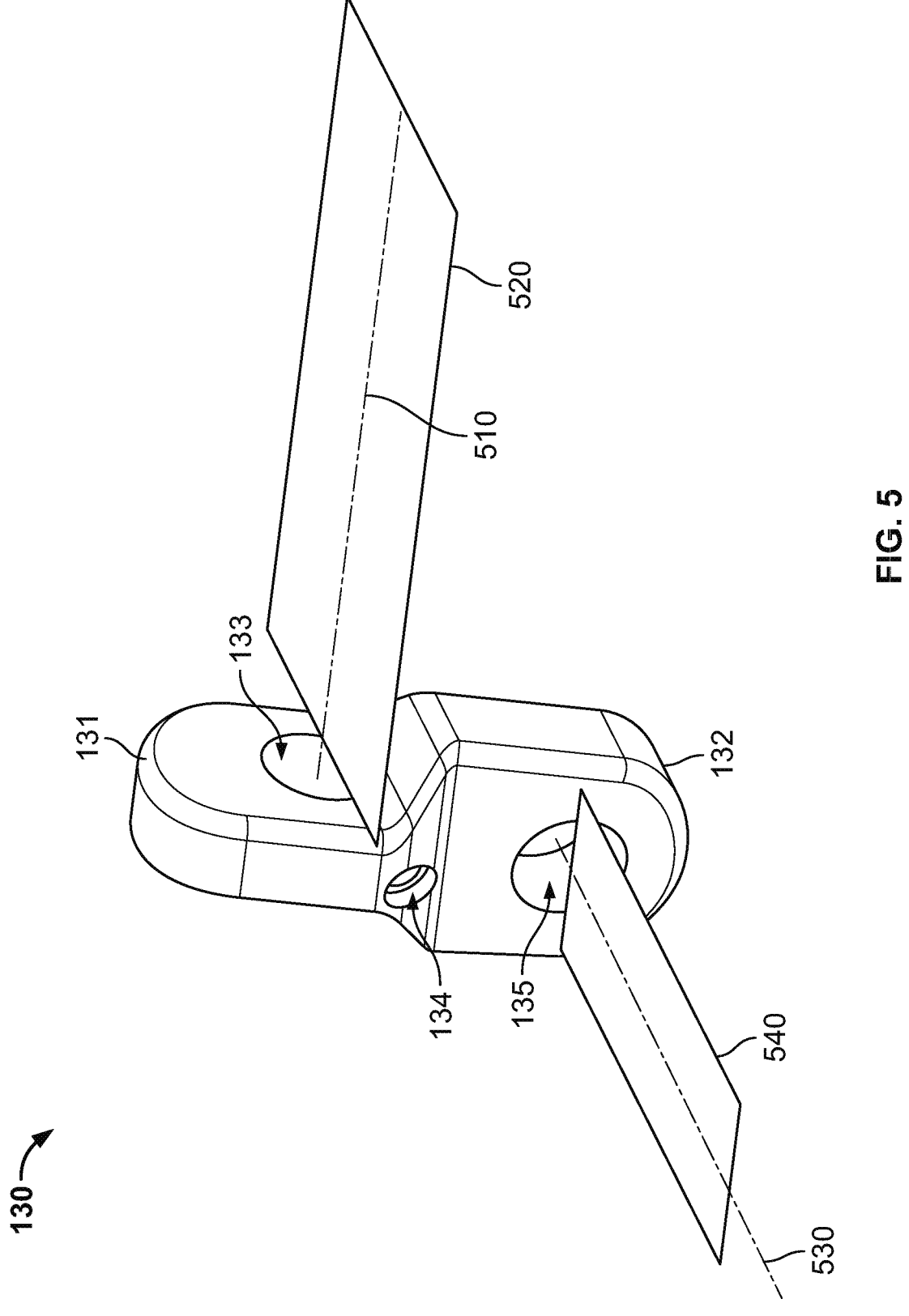
FIG. 5 depicts a perspective view of an illustrative coupler that shows the geometrical relationship between a central axis of a first bore defined by the coupler and a central axis of another (third) bore defined by the coupler, according to one or more embodiments described.
Figure 6:
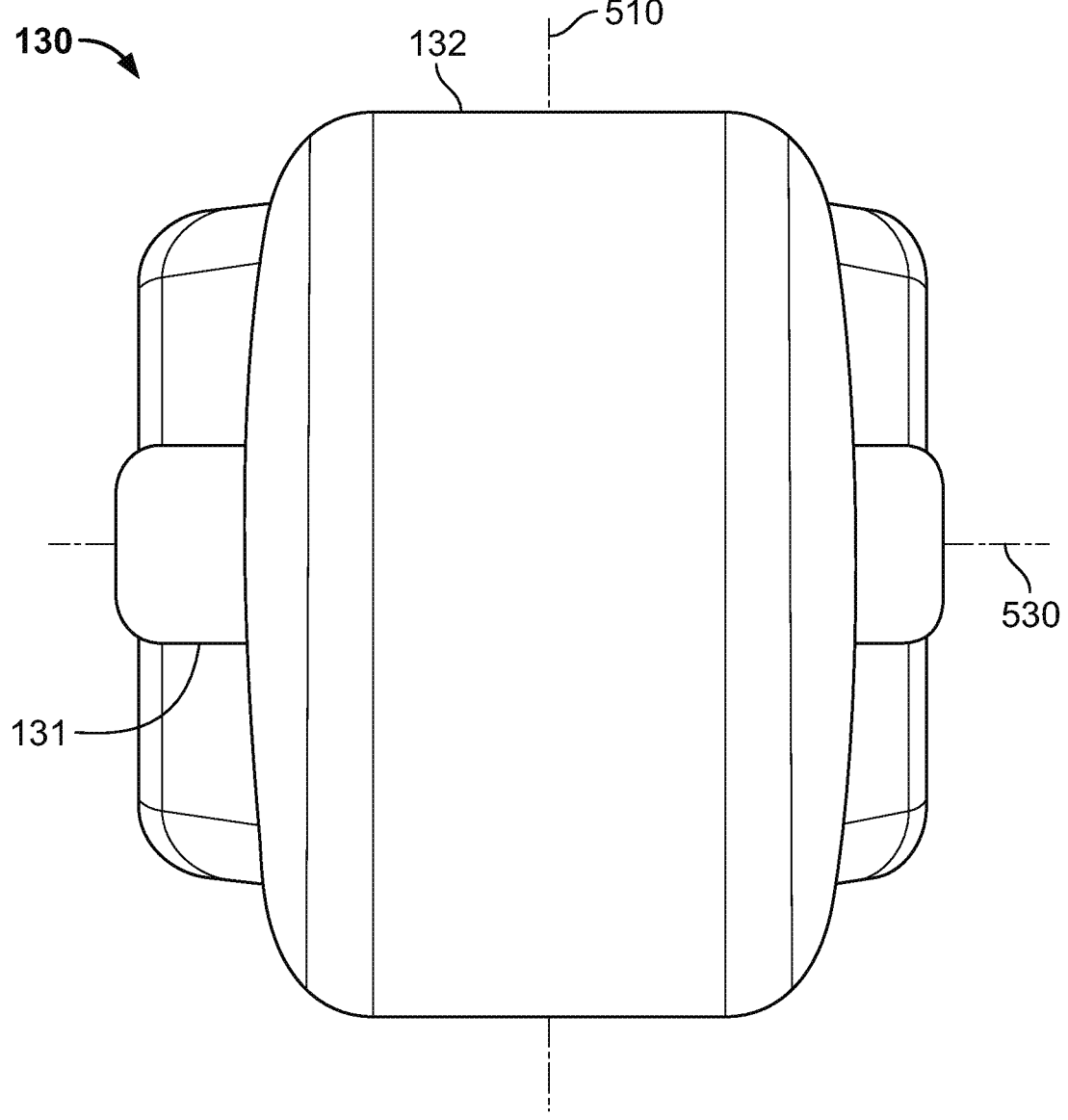
FIG. 6 depicts an end view of the coupler shown in FIG. 5 that shows the geometrical relationship between the central axis of the first bore defined by the coupler and the central axis of the third bore defined by the coupler.

FIG. 5 depicts a perspective view of the coupler 130 shown in FIGS. 1 and 2 that shows the geometrical relationship between a central axis of the first bore 133 defined by the coupler 130 and a central axis of the third bore 135 defined by the coupler 130, according to one or more embodiments. As described above, the coupler 130 can include the first lug 131 that can define the first bore 133 and the second bore 134 and the second lug 132 that can define the third bore 135. FIG. 6 depicts an end view of the coupler 130 shown in FIG. 5 that shows the geometrical relationship between the central axis 510 of the first bore 133 defined by the coupler 130 and the central axis 530 of the third bore 135 defined by the coupler. As shown in FIG. 5, the central axis 510 of the first bore 133 and the central axis 530 of the third bore 135 can be substantially orthogonal to one another as depicted in FIG. 6. As also shown in FIG. 5, the central axis 510 of the first bore 133 can lie in a first plane 520 and the central axis 530 of the third bore 135 can lie in a second plane 540. The first and second planes 520, 540 can be parallel or substantially parallel with respect to one another.

Figure 7:
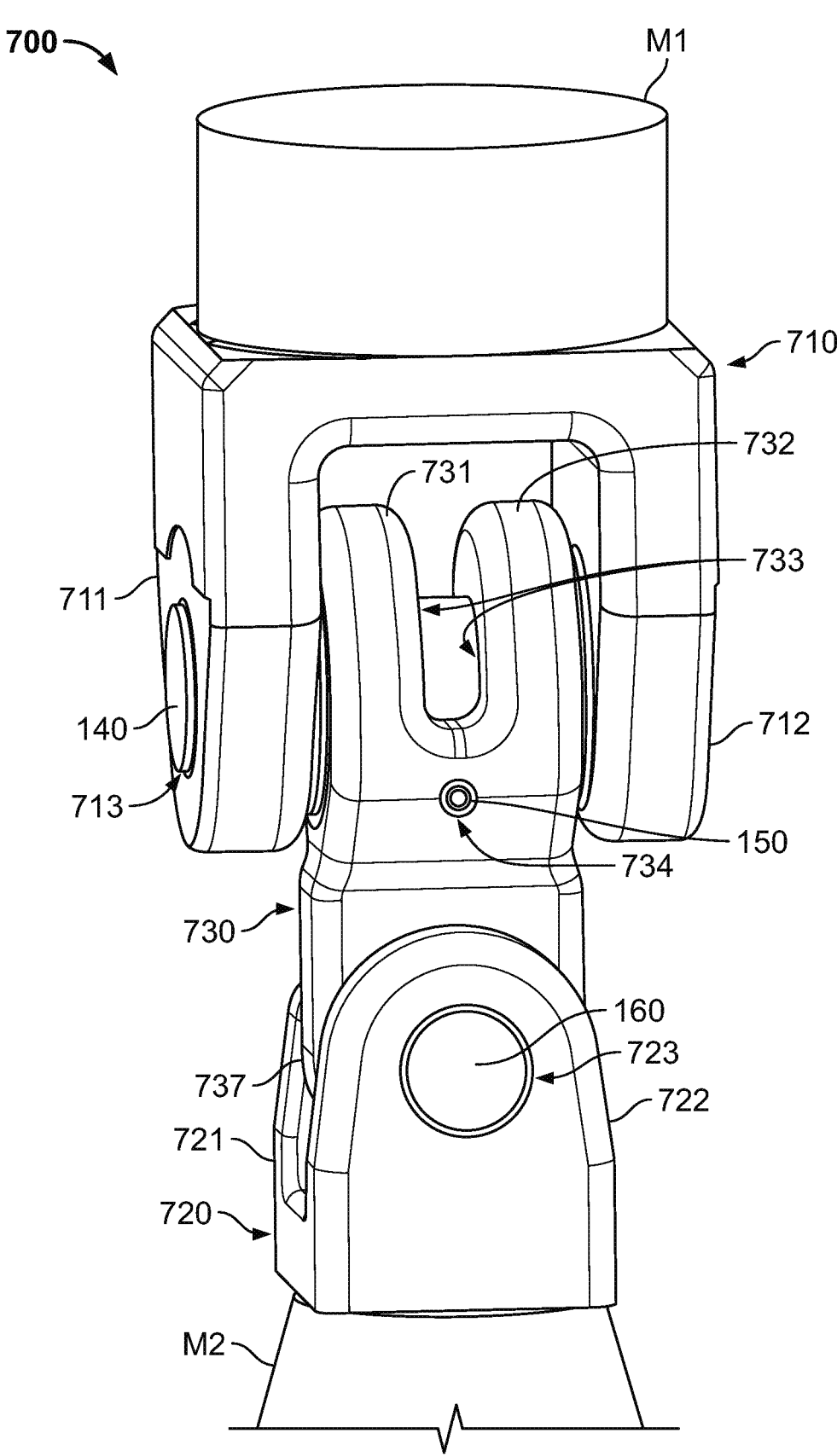
FIG. 7 depicts a perspective view of another illustrative dual axis joint connected to a first member and a second member, according to one or more embodiments described.

FIG. 7 depicts a perspective view of another illustrative dual axis joint 700 connected to a first member M1 and a second member M2, according to one or more embodiments. The dual axis joint 700 can include a first clevis 710, a second clevis 720, a coupler 730, a first pin 140, a wedge 150, and a second pin 160. The dual axis joint 700 can allow for articulation of the first member M1 relative to the second member M2 about two non-parallel, non-intersecting axes while transmitting axial forces, shear forces, torque, or a combination thereof from the first member M1 to the second member M2 and/or from the second member M2 to the first member M1.

The first clevis 710 can be joined, fastened, or otherwise connected to the first member M1 and the second clevis 720 can be joined, fastened, or otherwise connected to the second member M2. In some embodiments, the connection between the first clevis 710 and the first member M1 and the connection between the second clevis 720 and the second member M2 can be static such that the first clevis 710 does not move with respect to M1 and the second clevis 720 does not move with respect to M2. Suitable connection systems or methods can include, but are not limited to, welding, bolts, bolts and nuts, rivets, pins, screws, mechanical connectors such as a collet connector, adhesives, or the like.

The first clevis 710 can include a first pair of arms 711, 712. The first pair of arms 711, 712 can define axially aligned cylindrical bores at least partially therethrough (bore 713 is visible in FIG. 7). In some embodiments, one of the bores defined by the first pair of arms 711, 712 can be completely therethrough and one of the bores defined by the first pair of arms 711, 712 can be partially disposed therethrough. In other embodiments, both bores defined by the first pair of arms 711, 712 can be completely therethrough. The second clevis 720 can include a second pair of arms 721, 722. The second pair of arms 721, 722 can define axially aligned cylindrical bores at least partially therethrough (bore 723 is visible in FIG. 7). In some embodiments, one of the bores defined by the second pair of arms 721, 722 can be completely therethrough and one of the bores defined by the second pair of arms 721, 722 can be partially disposed therethrough. In other embodiments, both bores defined by the second pair of arms 721, 722 can be disposed completely therethrough.

The coupler 730 and the first and second pins 140, 160 can be or otherwise provide a structural connection or linkage between the first clevis 710 and the second clevis 720. The coupler 730 can define at least a first bore 733, a second bore 734, and a third bore (not visible but aligned with bore 723 defined by arm 722). The first bore 733 and the second bore 734 can partially intersect one another. In some embodiments, the third bore defined by the coupler 730 can be similar to or the same as the third bore 135 defined by the coupler 130 (see FIGS. 1 and 5). In some embodiments, the first bore 733 and the third bore defined by the coupler 730 can each be completely therethrough and the second bore 734 defined by the coupler 730 can be partially therethrough. In other embodiments, the first bore 733, the second bore 734, and the third bore defined by the coupler 730 can each be completely therethrough.

In some embodiments, the coupler 730 can include a pair of arms 731, 732 disposed toward a first end of the coupler 730 and a lug 737 disposed toward a second end of the coupler 130. The pair of arms 731, 732 can define the first bore 733, a body of the coupler 730 between the pair of arms 731,732 and the lug 737 can define the second bore 734, and the lug 737 can define the third bore. The coupler 730 can be connected to the first clevis 710 by placing, locating, or otherwise disposing the first pin 140 within the first bore 733 and the bores defined by the first pair of arms 711, 712 of the first clevis 710. The coupler 730 can be connected to the second clevis 720 by placing, locating, or otherwise disposing the second pin 160 within the third bore and the bores defined by the second pair of arms 721, 722 of the second clevis 720 (bore 723 is visible in FIG. 7). When in use, one or more forces on the dual axis joint 700 can be transmitted between the first clevis 710 and the coupler 730 through the first pin 740. Similarly, when in use, one or more forces on the dual axis joint 700 can be transmitted between the second clevis 720 and the coupler 730 through the second pin 160. In some embodiments, the first bore 733 and the third bore defined by the coupler 730 can be substantially orthogonal to one another. In some embodiments, the first bore 733 and the second bore 734 defined by the coupler can be substantially orthogonal to one another.

The wedge 150 can be disposed within the second bore 734 defined by the coupler 730. As shown in FIG. 7, the first bore 733 and the second bore 734 can be arranged or configured such that the wedge 150 and the first pin 140 can contact one another. For example, the first pin 140 can include the engagement surface 141 formed on a portion of the external surface 142 thereof and the wedge 150 can include the engagement surface 151 formed on the external surface 152 thereof such that the engagement surface 141 of the first pin 140 and the engagement surface 151 of the wedge 150 can at least partially contact one another to restrict relative movement between the first pin 140 and the coupler 130. In some embodiments, the contact between the engagement surface 151 of the wedge 150 and the engagement surface 141 of the first pin 140 can restrict or prevent relative movement between the first pin 140 and the coupler 730.

It should be understood that, in some embodiments, the second pin 160 can be the same or substantially the same as the first pin 140. For example, as further described below, in some embodiments, the second pin 160 can include one or more engagement surfaces that can be the same or similar to the engagement surface 141 of the first pin 140. In other embodiments, however, the second pin 160 can be free of any engagement surface such that the second pin 160 can be a substantially cylindrical body without any engagement surface formed on an outer surface thereof.

In some embodiments, the wedge 150 can be positioned within the second bore 734 such that the engagement surface 151 of the wedge 150 can be in contact with the engagement surface 141 of the first pin 140 and a sufficient axial force can be applied to the wedge 150, to preload the first pin 140 in a direction opposing a primary tensile loading of the dual axis joint 700 that the dual axis joint 700 is configured to be in when in a loaded condition. In some embodiments, the preload applied to the first pin 140 can be sufficient to bend the arms 731, 732 apart or away from one another. In such embodiments, the load applied to the first pin 140 can be reduced as an external tensile load is applied the dual axis joint 700. It has been discovered that pre-loading the first pin 140 via the wedge 150 can facilitate a significant reduction in the overall dimensions of the dual axis joint 700. More particularly, it has been discovered that pre-loading the first pin 140 via the wedge 150 can reduce the overall dimensions of the dual axis joint 700 such that a weight of the dual axis joint 700 can be >5 wt %, >10 wt %, >15 wt %, >20 wt %, >25 wt %, >30 wt %, >35 wt %, or >40 wt % less than a weight of a comparative dual axis joint constructed in the same manner except for the second bore 134 and the wedge 150 are not present to pre-load the first pin 140. The force to install the wedge 150 and achieve a desired preload can be applied via any number of methods including a jack screw mechanism, a hydraulic cylinder or hydraulic jack, impact force or other similar apparatus. The need for a bushing between the first pin 140 and the bores 733 defined by the coupler 730 can be eliminated as the relative movement between the first pin 140 and coupler 730 can be restricted or prevented.

Figure 8:
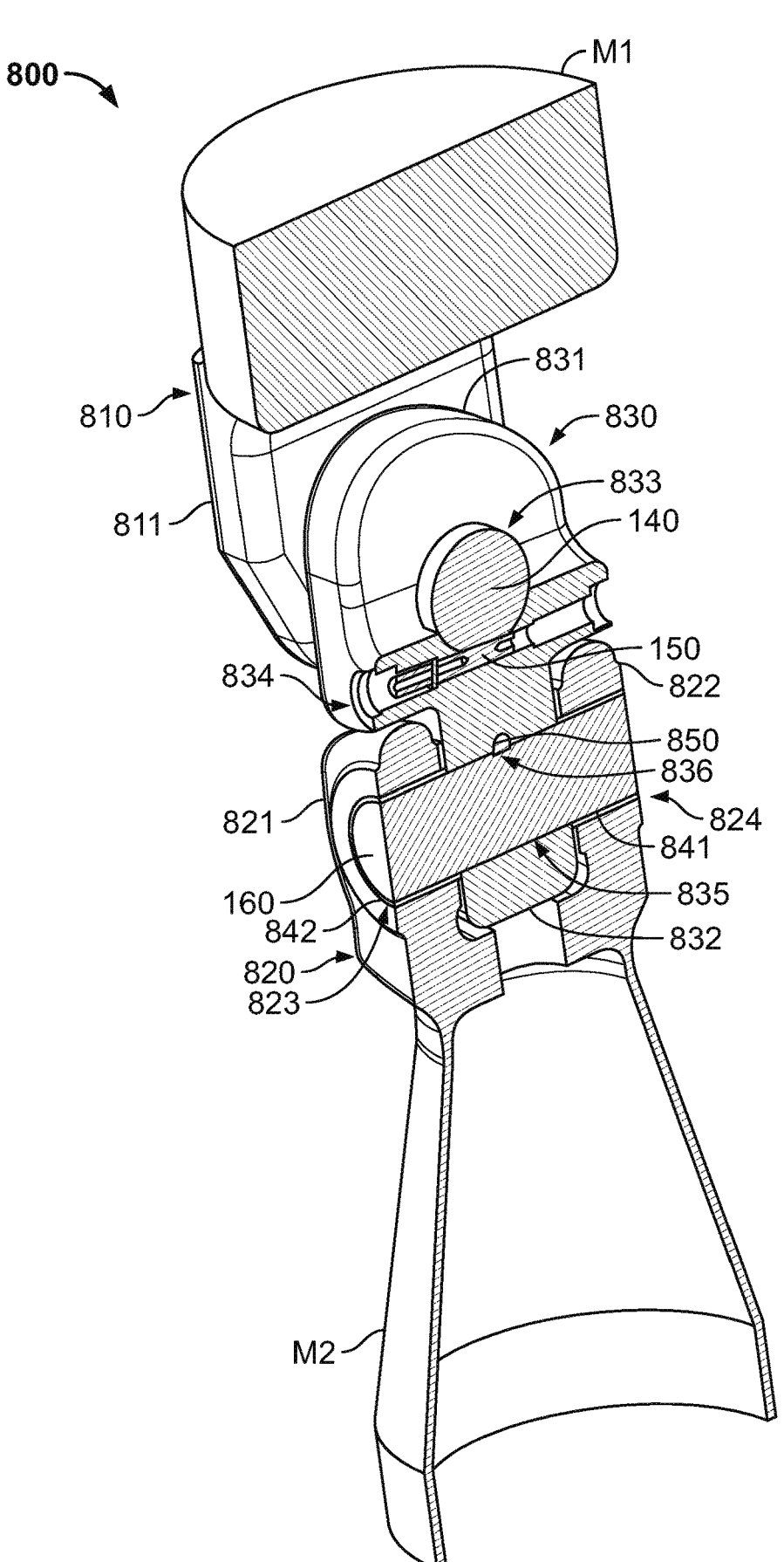
FIG. 8 depicts a cross-sectional view of another illustrative dual axis joint that includes two wedges disposed within a coupler of the dual axis joint between a first pin and a second pin, according to one or more embodiments described.

FIG. 8 depicts a cross-sectional view of another illustrative dual axis joint 800 that includes two wedges 150, 850 disposed within a coupler 830 of the dual axis joint 800 between a first pin 140 and a second pin 160, according to one or more embodiments. The dual axis joint 800 can include a first clevis 810, a second clevis 820, the coupler 830, the first pin 140, the first wedge 150, the second pin 160 and the second wedge 850. The dual axis joint 800 can be connected to a first member M1 and a second member M2. The dual axis joint 800 can allow for articulation of the first member M1 relative to the second member M2 about two non-parallel, non-intersecting axes while transmitting axial forces, shear forces, torque, or a combination thereof from the first member M1 to the second member M2 and/or from the second member M2 to the first member M1.

The first clevis 810 can be joined, fastened, or otherwise connected to the first member M1 and the second clevis 820 can be joined, fastened, or otherwise connected to the second member M2. The connection between the first clevis 810 and the first member M1 and the connection between the second clevis 820 and the second member M2 can be static such that the first clevis 810 does not move with respect to M1 and the second clevis 820 does not move with respect to M2. Suitable connection systems or methods can include, but are not limited to, welding, bolts, bolts and nuts, rivets, pins, screws, mechanical connectors such as a collet connector, adhesives, or the like.

The first clevis 810 can include a first pair of arms (arm 811 is visible in FIG. 8). The first pair of arms can define axially aligned cylindrical bores (not visible) at least partially therethrough. In some embodiments, one of the bores defined by the first pair of arms can be completely therethrough and one of the bores defined by the first pair of arms can be partially disposed therethrough. The second clevis 820 can include a second pair of arms 821, 822. The second pair of arms 821, 822 can define axially aligned cylindrical bores, 823, 824 at least partially therethrough. In some embodiments, one of the bores 823, 824 defined by the second pair of arms 821, 822 can be completely therethrough and one of the bores defined by the second pair of arms 821, 822 can be partially disposed therethrough.

The coupler 830 and the first and second pins 140, 160 can be or otherwise provide a structural connection or linkage between the first clevis 810 and the second clevis 820. The coupler 830 can define at least a first bore 833, a second bore 834, a third bore 835, and a fourth bore 836. In some embodiments, the first bore 833 and the third bore 835 defined by the coupler 830 can each be completely therethrough and the second bore 834 and the fourth bore 836 defined by the coupler 830 can be partially therethrough. In other embodiments, the first bore 833, third bore 835, and at least one of the second bore 834, and the fourth bore 836 defined by the coupler 830 can each be completely therethrough. The first bore 833 and the second bore 834 can partially intersect one another. The third bore 835 and the fourth bore 836 can partially intersect one another.

The coupler 830 can include a pair of arms (one is shown in FIG. 8, 831) disposed toward a first end of the coupler 830 and a lug 832 disposed toward a second end of the coupler 830. The pair of arms (one is shown, 831) can define the first bore 833. The body of the coupler 830 can define the second bore 834 between the pair of arms disposed toward the first end of the coupler 830 and the lug 832 disposed toward the second end of the coupler 830. The lug 832 disposed toward the second end of the coupler can define the third bore 835 and the fourth bore 836. The coupler 830 can be connected to the first clevis 810 by placing, locating, or otherwise disposing the first pin 140 within the first bore 833 and the bores defined by the first pair of arms (arm 811 is visible in FIG. 8) of the first clevis 810. The coupler 830 can be connected to the second clevis 820 by placing, locating, or otherwise disposing the second pin 160 within the third bore 835 and the bores 823, 824 defined by the second pair of arms 821, 822 of the second clevis 820. When in use, a loading and/or force(s) on the dual axis joint 800 can be transmitted between the first clevis 810 and the coupler 830 through the first pin 140. Similarly, when in use, a loading and/or force(s) on the dual axis joint 800 can be transmitted between the second clevis 820 and the coupler 830 through the second pin 160.

In some embodiments, the first bore 833 and the third bore 835 can be substantially orthogonal to one another. In some embodiments, the first bore 833 and the second bore 834 can be substantially orthogonal to one another. In some embodiments, the third bore 835 and the fourth bore 836 can be substantially orthogonal to one another.

The dual axis joint 800 can include the first wedge 150 that can be disposed within the second bore 834 defined by the coupler 830. As shown in FIG. 8, the first bore 833 and the second bore 834 can be arranged or configured such that the first wedge 150 and the first pin 140 can contact one another. For example, the first pin 140 can include the engagement surface 141 formed on a portion of an external surface 142 thereof and the first wedge 150 can include an engagement surface 151 formed on an external surface 152 thereof such that the engagement surface 141 of the first pin 140 and the engagement surface 151 of the first wedge 150 can contact one another to restrict relative movement between the first pin 140 and the coupler 130 (see FIGS. 3 and 4). In some embodiments, the contact between the engagement surface 151 of the first wedge 150 and the engagement surface 141 of the first pin 140 can restrict or prevent relative movement between the first pin 140 and the coupler 830.

In some embodiments, the first wedge 150 can be positioned within the second bore 834 such that the engagement surface 151 of the wedge 150 can be in contact with the engagement surface 141 of the first pin 140 and a sufficient axial force can be applied to the first wedge 150, to preload the first pin 140 in a direction opposing a primary tensile loading of the dual axis joint 800 the dual axis joint 800 is configured to be in when in a loaded condition. In some embodiments, the preload applied to the first pin 140 can be sufficient to bend the pair of arms (one is shown, 831) of the first end of the coupler 830 apart or away from one another. In such embodiments, the load applied to the first pin 140 can be reduced as an external tensile load is applied the dual axis joint 800. Pre-loading the first pin 140 via the first wedge 150 can facilitate a significant reduction in the overall dimensions of the dual axis joint 800. More particularly, pre-loading the first pin 140 via the wedge 150 can reduce the overall dimensions of the dual axis joint 800 such that a weight of the dual axis joint 800 can be >5 wt %, >10 wt %, >15 wt %, >20 wt %, >25 wt %, >30 wt %, >35 wt %, or >40 wt % less than a weight of a comparative dual axis joint constructed in the same manner except for the second bore 834 and the first wedge 150 are not present to pre-load the first pin 140. The force to install the wedge 150 and achieve a desired preload can be applied via any number of methods including a jack screw mechanism, a hydraulic cylinder or hydraulic jack, impact force or other similar apparatus. It has also been discovered that the need for a bushing between the first pin 140 and the bores 831 and 832 defined by the coupler 830 can be eliminated as the relative movement between the first pin 140 and coupler 830 can be restricted or prevented.

In some embodiments, the second wedge 850 can be disposed within the fourth bore 836 defined by the coupler 830. The third bore 835 and the fourth bore 836 can be arranged or configured such that the second wedge 850 and the second pin 160 can contact one another. For example, the second pin 160 can include the engagement surface 141 (see FIG. 3) formed on a portion of the external surface 142 thereof and the second wedge 850 can include the engagement surface 151 (see FIG. 4) formed on the external surface 152 thereof such that the engagement surface 141 of the second pin 160 and the engagement surface 151 of the second wedge 850 can contact one another to restrict relative movement between the second pin 160 and the coupler 830. In some embodiments, the contact between the engagement surface 151 of the second wedge 850 and the engagement surface 141 of the second pin 160 can restrict or prevent relative movement between the second pin 160 and the coupler 830. In such embodiments, the need for a bushing between the external surface of the second pin 160 and the internal surface of the third bore 835 defined by the coupler 830 can be eliminated as the relative movement between the second pin 160 and coupler 830 can be restricted or prevented.

In some embodiments the fourth bore 836 and the second wedge 850 can be placed or located in a position that can be on a side of the second pin 160 that can be opposite from the second member M2, as shown in FIG. 8. In other embodiments, the fourth bore 836 and the second wedge 850 can be placed or located in a position that can be on the same side of the second pin 160 as the second member M2, not shown. In some embodiments a bushing 841, 842 can be disposed between an inner surface of each arm of the second pair of arms 821, 822 and the second pin 160. The bushings can be manufactured from bronze, brass, a polymer, a fiber reinforced composite material, or any other suitable material.

Figure 9:
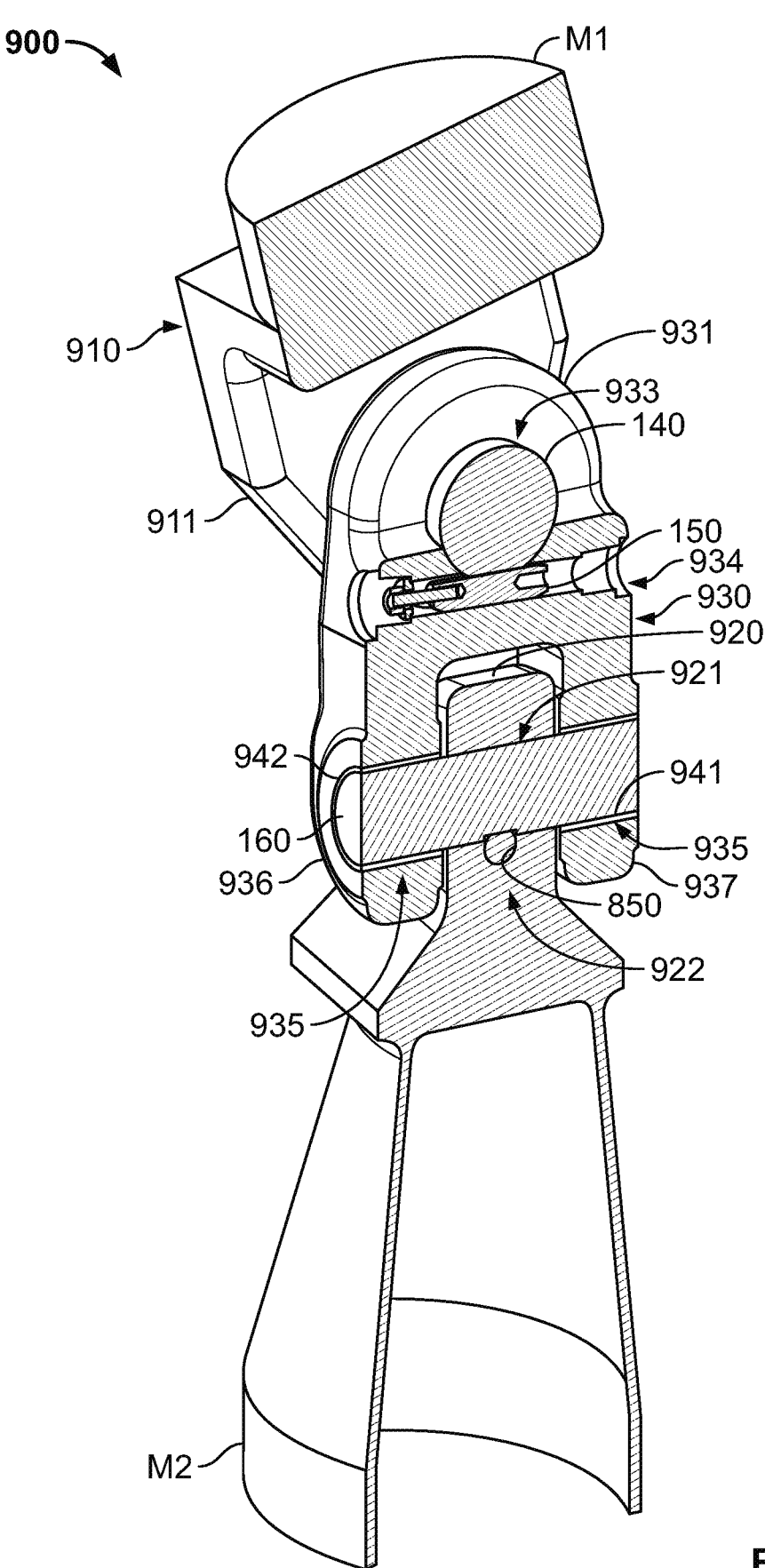
FIG. 9 depicts a cross-sectional view of another illustrative dual axis joint that includes a first wedge disposed within a coupler of the dual axis joint between a first pin and a second pin and a second wedge disposed within the coupler of the dual axis joint on a side of the second pin that is opposite of the first pin, according to one or more embodiments described.

FIG. 9 depicts a cross-sectional view of another illustrative dual axis joint 900 that includes a first wedge 150 disposed within a coupler 930 of the dual axis joint 900 between a first pin 140 and a second pin 160 and a second wedge 850 disposed within the coupler 930 of the dual axis joint 900 on a side of the second pin 160 that is opposite of the first pin 140, according to one or more embodiments. The dual axis joint 900 can include a clevis 910, a lug 920, the coupler 930, the first pin 140, the first wedge 150, the second pin 160, and the second wedge 850. The dual axis joint 900 shown in FIG. 9 can be connected to a first member M1 and a second member M2, according to one or more embodiments. The dual axis joint 900 can allow for articulation of the first member M1 relative to the second member M2 about two non-parallel, non-intersecting axes while transmitting axial forces, shear forces, torque, or a combination thereof from the first member M1 to the second member M2 and/or from the second member M2 to the first member M1.

The clevis 910 can be joined, fastened, or otherwise connected to the first member M1 and the lug 920 can be joined, fastened, or otherwise connected to the second member M2. The connection between the clevis 910 and the first member M1 and the connection between the lug 920 and the second member M2 can be static such that the clevis 910 does not move with respect to M1 and the lug 920 does not move with respect to M2. Suitable connection systems or methods can include, but are not limited to, welding, bolts, bolts and nuts, rivets, pins, screws, mechanical connectors such as a collet connector, adhesives, or the like.

The clevis 910 can include a pair of arms (one is shown in FIG. 9, 911). The pair of arms of the clevis 910 can define axially aligned cylindrical bores (not visible) at least partially therethrough. In some embodiments, one of the bores defined by the pair of arms of the clevis 910 can be completely therethrough and one of the bores defined by the pair of arms of the clevis 910 can be partially disposed therethrough. The lug 920 can define a first bore 921 therethrough and a second bore 922 at least partially therethrough. The first bore 921 and the second bore 922 can partially intersect one another. The coupler 930 and the first and second pins 140, 160 can be or otherwise provide a structural connection or linkage between the clevis 910 and the lug 920. The coupler 930 can define a first bore 933, a second bore 934, and a third bore 935. In some embodiments, the first bore 933 and the third bore 935 defined by the coupler 930 can each be completely therethrough and the second bore 934 defined by the coupler 930 can be partially therethrough. In other embodiments, the first bore 933, the second bore 934, and the third bore 935 defined by the coupler 830 can each be completely therethrough.

The coupler 930 can include a first pair of arms (one is shown, 931) disposed toward a first end of the coupler 930 and a second pair of arms 936, 937 disposed toward a second end of the coupler 930. The first pair of arms can define the first bore 933, the body of the coupler 930 disposed between the first and second ends of the coupler 930 can define the second bore 934, and the second pair of arms 936, 937 can define the third bore 935. The first bore 933 and the second bore 934 defined by the coupler 933 can partially intersect one another. The coupler 930 can be connected to the clevis 910 by placing, locating, or otherwise disposing the first pin 140 within the first bore 933 and the bores defined by the pair of arms of the clevis 910. The coupler 930 can be connected to the lug 920 by placing, locating, or otherwise disposing the second pin 160 within the first bore 921 of the lug 920 and the bores 935 defined by the second pair of arms 936, 937. When in use, a loading and/or force(s) on the dual axis joint 900 can be transmitted between the clevis 910 and the coupler 930 through the first pin 140. Similarly, when in use, a loading and/or force(s) on the dual axis joint 900 can be transmitted between the lug 920 and the coupler 930 through the second pin 160. In some embodiments, the first bore 933 defined by the coupler 930 and the third bore 935 defined by the coupler 930 can be substantially orthogonal to one another. In some embodiments, the first bore 933 and the second bore 934 defined by the coupler 930 can be substantially orthogonal to one another. In some embodiments, the first bore 921 and the second bore 922 defined by the lug 920 can be substantially orthogonal to one another.

The first wedge 150 can be disposed within the second bore 934 defined by the coupler 930. The first bore 933 defined by the coupler 930 and the second bore 934 defined by the coupler 930 can be arranged or configured such that the first wedge 150 and the first pin 140 can contact one another. For example, the first pin 140 can include the engagement surface 141 formed on a portion of an external surface 142 thereof and the first wedge 150 can include the engagement surface 151 formed on the external surface 152 thereof such that the engagement surface 141 of the first pin 140 and the engagement surface 151 of the first wedge 150 can contact one another to restrict relative movement between the first pin 140 and the coupler 930. In some embodiments, the contact between the engagement surface 151 of the first wedge 150 and the engagement surface 141 of the first pin 140 can restrict or prevent relative movement between the first pin 940 and the coupler 930.

In some embodiments, the first wedge 150 can be positioned within the second bore 934 such that the engagement surface 151 of the wedge 150 can be in contact with the engagement surface 141 of the first pin 140 and a sufficient axial force can be applied to the first wedge 150 to preload the first pin 140 in a direction opposing a primary tensile loading of the dual axis joint 900. In some embodiments, the preload applied to the first pin 140 can be sufficient to bend the first pair of arms (one is shown, 931) disposed toward the first end of the coupler 930 apart or away from one another. In such embodiments, the load applied to the first pin 140 can be reduced as an external tensile load is applied the dual axis joint 900. It has been found that pre-loading the first pin 140 via the first wedge 150 can facilitate a significant reduction in the overall dimensions of the dual axis joint 900. More particularly, pre-loading the first pin 140 via the wedge 150 can reduce the overall dimensions of the dual axis joint 100 such that a weight of the dual axis joint 900 can be >5 wt %, >10 wt %, >15 wt %, >20 wt %, >25 wt %, >30 wt %, >35 wt %, or >40 wt % less than a weight of a comparative dual axis joint constructed in the same manner except for the second bore 834 and the first wedge 150 are not present to pre-load the first pin 840. The force to install the wedge 150 and achieve a desired preload can be applied via any number of methods including a jack screw mechanism, a hydraulic cylinder or hydraulic jack, impact force or other similar apparatus. The need for a bushing between the first pin 140 and the inner surfaces of the bores (one is shown, 931) defined by the coupler 930 can be eliminated as the relative movement between the first pin 140 and coupler can be restricted or prevented.

In some embodiments, the dual axis joint 900 can include the second wedge 850 disposed within the second bore 922 defined by the lug 920. The third bore 935 of the coupler 930 and the second bore 922 of the lug 920 can be arranged or configured such that the second wedge 850 and the second pin 160 can contact one another. For example, the second pin 160 can include the engagement surface 141 formed on a portion of the external surface 142 thereof and the second wedge 850 can include the engagement surface 151 formed on the external surface 152 thereof such that the engagement surface 141 of the second pin 160 and the engagement surface 151 of the second wedge 850 can contact one another to restrict relative movement between the second pin 160 and the lug 920. In some embodiments, the contact between the engagement surface 151 of the second wedge 850 and the engagement surface 141 of the second pin 160 can restrict or prevent relative movement between the second pin 160 and the lug 920. The need for a bushing between the external surface of the second pin 160 and the bore 935 defined by the lug 920 can be eliminated as the relative movement between the second pin 160 and the lug 920 can be restricted or prevented. As shown in FIG. 9, in some embodiments, the second wedge 850 can be placed or located in a position that is on the same side of the second pin 160 as the second member M2. In other embodiments, the second wedge 850 can be placed or located on a side of the second pin 160 that can be opposite from that of the second member M2 (not shown). In some embodiments a bushing 942, 941 can be disposed between an inner surface of each bore defined by the second pair of arms 937, 936, respectively, and the external surface of the second pin 160. The bushings can be manufactured from bronze, brass, a polymer, a fiber reinforced composite material, or any other suitable material.

Figure 10:
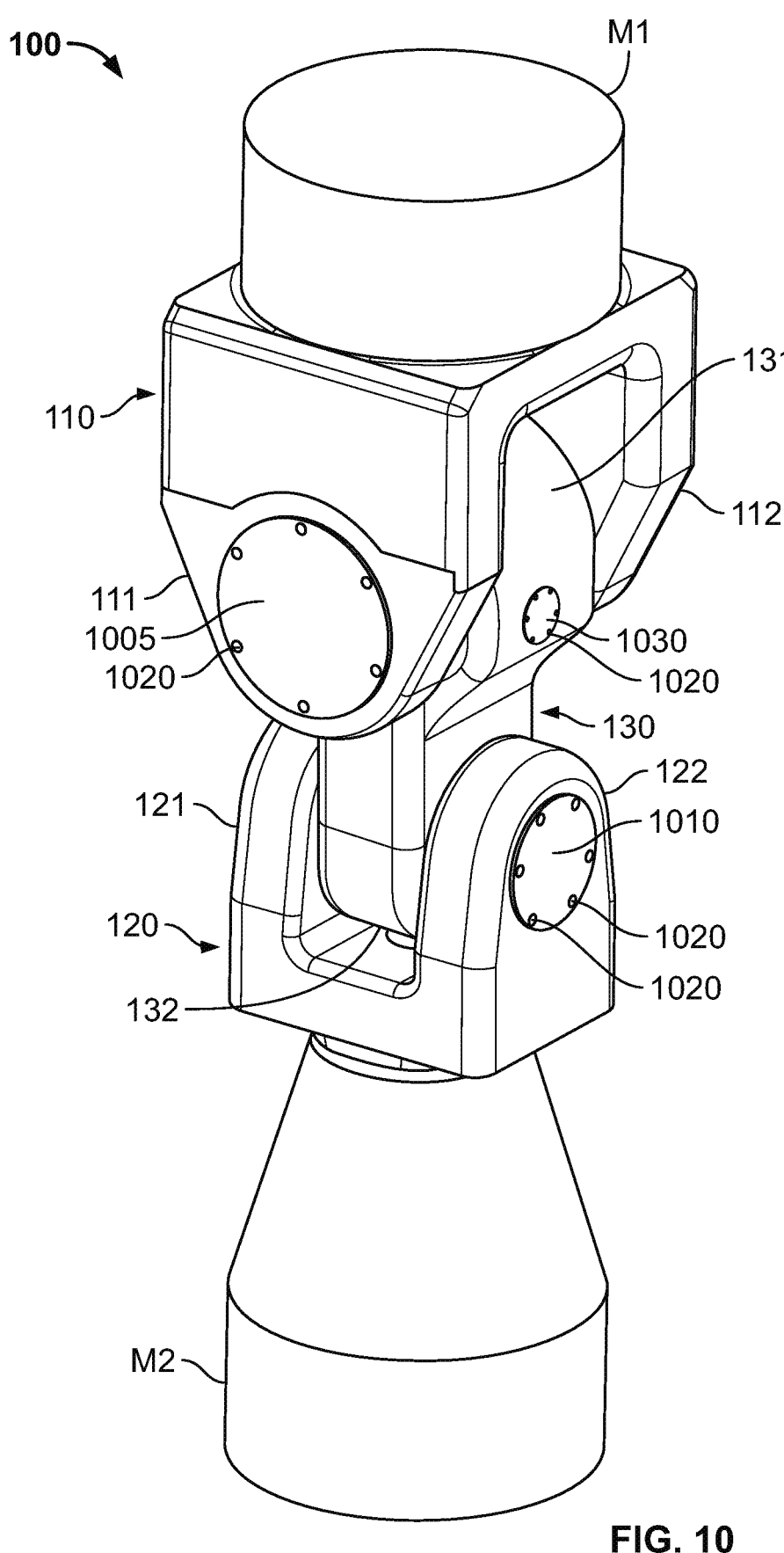
FIG. 10 depicts the dual axis joint shown in FIG. 1 that further includes cover plates disposed over first and second pins and a cover plate disposed over a wedge located within the dual axis joint, according to one or more embodiments described.

FIG. 10 depicts the dual axis joint 100 shown in FIG. 1 that further includes cover plates 1005, 1010 disposed over the first and second pins 140, 160 and a cover plate 1030 disposed over the wedge 150 located within the dual axis joint 100, according to one or more embodiments. Cover plates 1005, 1010 can be used to secure the first and second pins 140, 160 within the bores defined by first and second clevis 110, 120. The cover plates 1005, 1010 can be fixed to the outer surface of the first and second clevis (110, 120) as shown or directly to the end of each pin 140, 160, not shown. The cover plates 1005, 1010 can be attached to the clevis 110, 120 or the pin 140, 160 by at least one bolt, threaded screw, cap screw, or other mechanical fastener 1020. In some embodiments, the end cap plates 1005, 1010, 1030 can be fitted with a seal, not shown to keep debris, the exterior environment, moisture or water in the case of submerged applications, out of the space between the clevis 110, 120 and the pin 140, 160. It should be understood that additional cover plates can be disposed over the opposite ends of the first and second pins 140, 160 and should the bore the wedge 150 is disposed in extend through the coupler 130 an additional cover plate can also be disposed over the opposite end of the bore.

Figure 11:
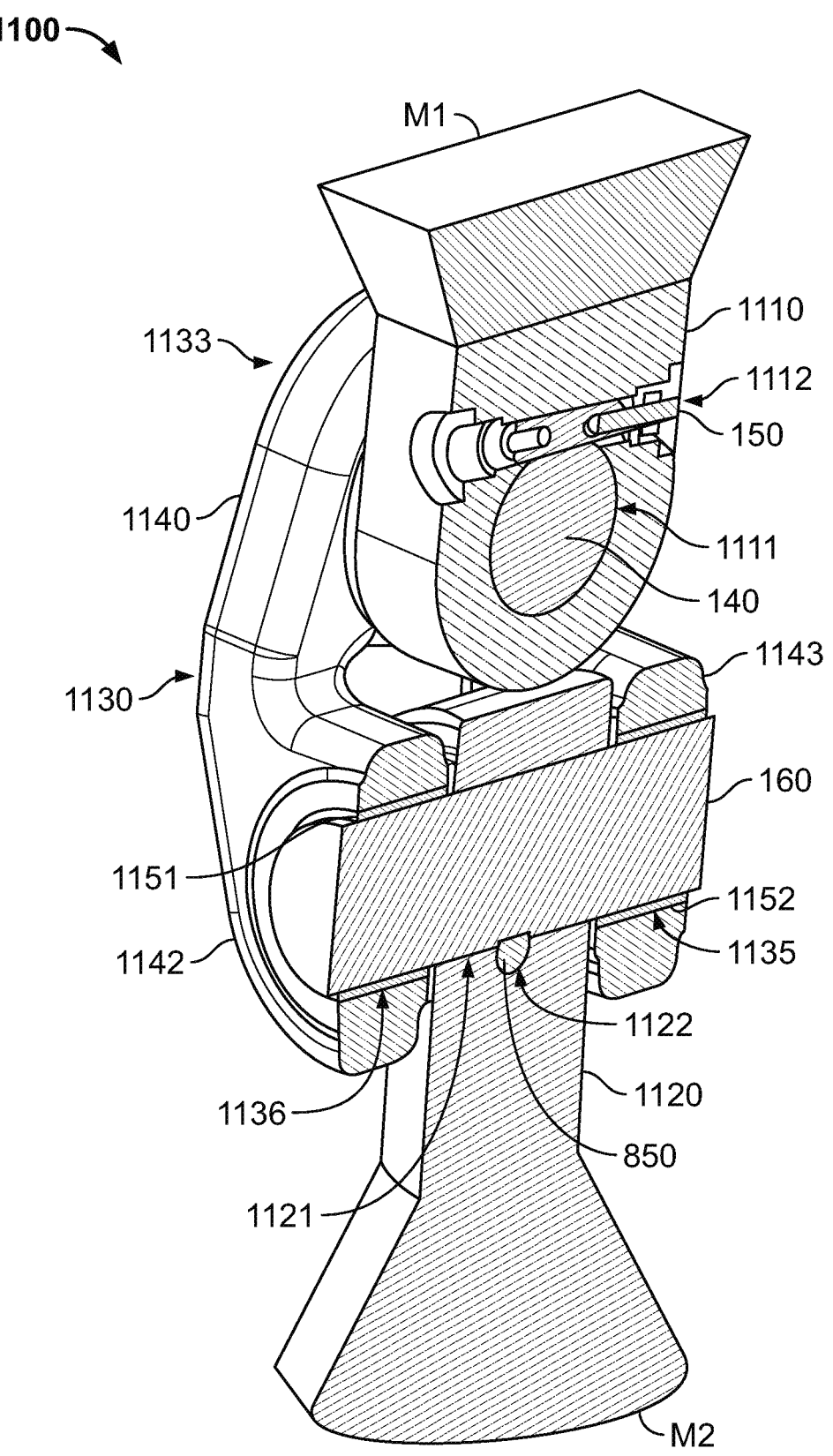
FIG. 11 depicts a perspective cross-sectional view of another illustrative dual axis joint connected to a first member and a second member, according to one or more embodiments described.

FIG. 11 depicts a perspective cross-sectional view of another illustrative dual axis joint 1100 connected to a first member M1 and a second member M2, according to one or more embodiments. The dual axis joint 1100 can include a first lug 1110, a second lug 1120, a coupler 1130, a first pin 140, a first wedge 150, a second pin 160 and, optionally, a second wedge 850. The dual axis joint 1100 can allow for articulation of the first member M1 relative to the second member M2 about two non-parallel, non-intersecting axes while transmitting axial forces, shear forces, torque, or a combination thereof from the first member M1 to the second member M2 and/or from the second member M2 to the first member M1.

The first lug 1110 can be joined, fastened, or otherwise connected to the first member M1 and the second lug 1120 can be joined, fastened, or otherwise connected to the second member M2. In some embodiments, the connection between the first lug 1110 and the first member M1 and the connection between the second lug 1120 and the second member M2 can be static such that the first lug 1110 does not move with respect to M1 and the second lug 1120 does not move with respect to M2. Suitable connection systems or methods can include, but are not limited to, welding, bolts, bolts and nuts, rivets, pins, screws, mechanical connectors such as a collet connector, adhesives, or the like.

The first lug 1110 can define a first bore 1111 therethrough and a second bore 1112 at least partially therethrough. The first bore 1111 and the second bore 1112 defined by the first lug 1110 can partially intersect one another. In some embodiments, the first bore 111 and the second bore 1112 can be substantially orthogonal to one another. The second lug 1120 can define a first bore therethrough 1121 and, optionally, a second bore 1122 at least partially therethrough. When the second lug 1120 defines the optional second bore 1122, the first bore 1121 and the second bore 1122 defined by the coupler 1120 can partially intersect one another. In some embodiments, when the second lug 1120 defines the optional second bore 1122, the first bore 1121 and the second bore 1122 can be substantially orthogonal with respect to one another. The coupler 1130 and the first and second pins 140, 160 can be or otherwise provide a structural connection or linkage between the first lug 1110 and the second lug 1120.

The coupler 1130 can include a first pair of arms (one is shown, 1140) disposed toward a first end of the coupler 1130 that can define a first pair of bores (the location of one, 1133, is located on the back side of arm 1140) and a second pair of arms 1142, 1143 disposed toward a second end of the coupler 1130 that can define a second pair of bores 1135, 1136. The first pair of bores and/or the second pair of bores defined by the coupler 1130 can be axially aligned with one another. In some embodiments, the first pair of bores defined by the coupler 1130 and the second pair of bores defined by the coupler 1130 can each be completely therethrough. In other embodiments one of the bores of the first pair of bores and/or one of the bores of the second pair bores defined by the coupler 1130 can be completely therethrough and the other bore of the first pair of bores and/or the other bore of the second pair of bores defined by the coupler 1130 can be partially therethrough.

The coupler 1130 can be connected to the first lug 1110 by placing, locating, or otherwise disposing the first pin 140 within the first bore 1111 and the axially aligned bores (1133 is shown on FIG. 11) defined by the first pair of arms of the coupler 1130. The coupler 1130 can be connected to the second lug 1120 by placing, locating, or otherwise disposing the second pin 160 within the bore 1121 of the second lug 1120 and the axially aligned bores 1135, 1136 defined by the second pair of arms 1142, 1143 of the coupler 1130. When in use, a loading and/or force(s) on the dual axis joint 1100 can be transmitted between the first lug 1110 and the coupler 1130 through the first pin 140. Similarly, when in use, a loading and/or force(s) on the dual axis joint 1100 can be transmitted between the second lug 1120 and the coupler 1130 through the second pin 160. In some embodiments, the first pair of axially aligned bores (1133 is shown in FIG. 11) defined by the coupler 1130 and the second pair of axially aligned bores 1135, 1136 defined by the coupler 1130 can be substantially orthogonal to one another.

The first wedge 150 can be disposed within the second bore 1112 defined by the first lug 1110. The first bore 1111 and the second bore 1112 defined by the first lug 1110 can be arranged or configured such that the first wedge 150 and the first pin 140 can contact one another. For example, the first pin 140 can include the engagement surface 141 formed on a portion of the external surface 142 thereof and the first wedge 150 can include the engagement surface 151 formed on the external surface 152 thereof such that the engagement surface 141 of the first pin 140 and the engagement surface 151 of the first wedge 150 can contact one another to restrict relative movement between the first pin 140 and the first lug 1110. In some embodiments, the contact between the engagement surface 151 of the first wedge 150 and the engagement surface 141 of the first pin 140 can restrict or prevent relative movement between the first pin 140 and the first lug 1110.

In some embodiments, the first wedge 150 can be positioned within the second bore 1112 such that the engagement surface 151 of the wedge 150 can be in contact with the engagement surface 141 of the first pin 140 and a sufficient axial force can be applied to the first wedge 150 to preload the first pin 140 in a direction aligned with a primary tensile loading of the dual axis joint 1100. In other embodiments, the first wedge 150 can be positioned within the second bore 1112 such that the engagement surface 151 of the wedge 150 can be in contact with the engagement surface 141 of the first pin 140 and a sufficient axial force can be applied to the first wedge 150, to preload the first pin 140 in a direction opposing a primary tensile loading of the dual axis joint 1100.

The force to install the wedge 150 and achieve a desired preload can be applied via any number of methods including a jack screw mechanism, a hydraulic cylinder or hydraulic jack, impact force, or other similar apparatus. The need for a bushing between the external surface of the first pin 140 and the inner surface of the bore 1111 defined by the first lug 1110 can be eliminated as the relative movement between the first pin 140 and first lug 1110 can be restricted or prevented. In some embodiments, the second bore 1112 and the first wedge 150 can be placed or located on a side of the pin 140 that can be opposite that of the first member M1 such that the first wedge 150 can be located between the first pin 140 and the second pin 160 (not shown). In other embodiments, the first wedge 150 can be placed or located on a side of the pin 140 that can be the same as the first member M1, as shown in FIG. 11.

In some embodiments, the dual axis joint 1100 can include the optional second wedge 850 that can be disposed within the optional second bore 1122 defined by the second lug 1120. The second bore 1122 defined by the second lug 1120 can be arranged or configured such that the second wedge 850 and the second pin 160 can contact one another. The second bore 1122 of the second lug 1120 can be arranged or configured such that the second pin 160 can include the engagement surface 141 formed on a portion of the external surface 142 thereof and the second wedge 850 can include the engagement surface 151 formed on the external surface 152 thereof such that the engagement surface 141 of the second pin 160 and the engagement surface 151 of the second wedge 850 can contact one another to restrict relative movement between the second pin 160 and the second lug 1120. In some embodiments, the contact between the engagement surface 151 of the second wedge 850 and the engagement surface 141 of the second pin 160 can restrict or prevent relative movement, e.g., rotation, between the second pin 160 and the second lug 1120. In some embodiments, the need for a bushing, between the second pin 160 and an inner surface of the second bore 1121 defined by the second lug 1120 can be eliminated as the relative movement between the second pin 160 and second lug 1120 can be restricted or prevented. In some embodiments the optional second bore 1122 and the second wedge 850 can be placed or located on a side of the second pin 160 that can be opposite that of the second member M2 such that the second wedge 850 can be located between the first pin 140 and the second pin 160 (not shown). In other embodiments, the optional second bore 1122 and the optional second wedge 850 can be placed or located on a side of the pin 160 that can be the same as the second member M2, as shown in FIG. 11. In some embodiments, a bushing 1151, 1152 can be disposed between an inner surface of each arm of the second pair of arms 1142, 1143 and the second pin 160. The bushings can be manufactured from bronze, brass, a polymer, a fiber reinforced composite material, or any other suitable material.

Figure 12:
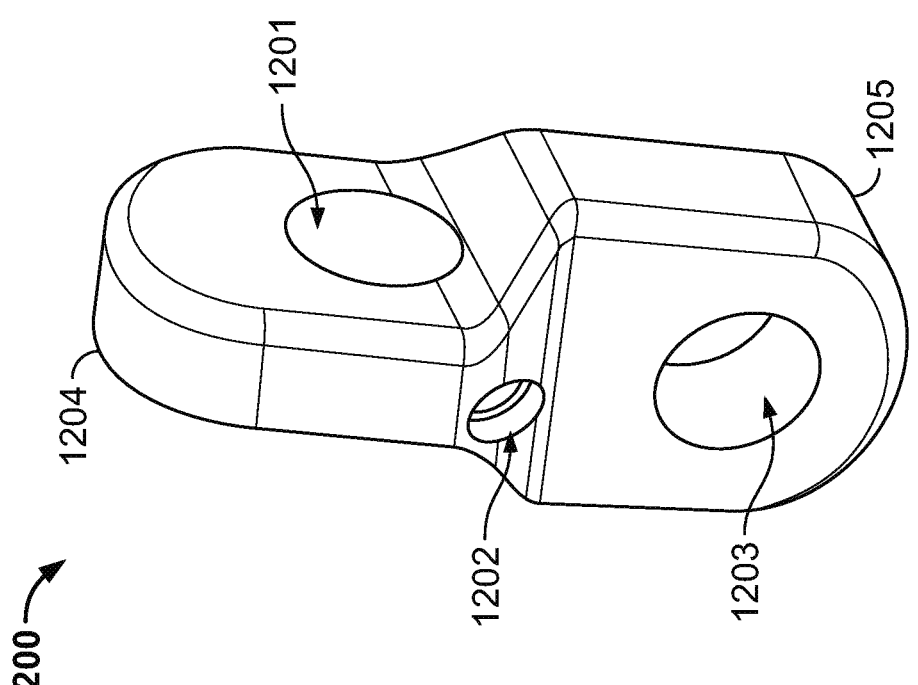
FIG. 12 depicts a perspective view of an illustrative coupler that defines a first bore and a second bore toward a first end thereof and a third bore toward a second end thereof, according to one or more embodiments described.

FIG. 12 depicts a perspective view of an illustrative coupler 1200 that defines a first bore 1201 and a second bore 1202 toward a first end thereof and a third bore 1203 toward a second end thereof, according to one or more embodiments. In some embodiments, the first bore 1201 defined by the coupler 1200 and the third bore 1203 defined by the coupler 1200 can each be completely therethrough and the second bore 1202 defined by the coupler 1200 can be partially therethrough or completely therethrough. The first bore 1201 and the second bore 1202 can partially intersect one another. In some embodiments, the partial intersection between the first bore 1201 and the second bore 1202 can be centrally located, with respect to a length of the first bore 1201 between a first end and a second end thereof. In other embodiments, the partial intersection between the first bore 1201 and the second bore 1202 can be located closer to first end or the second end of the first bore 1201 such that the partial intersection is not centered along a length of the first bore 1201.

The coupler 1200 can include a first lug 1204 disposed toward a first end of the coupler 1200 and a second lug 1205 disposed toward a second end of the coupler 1200. The first lug 1204 can define the first bore 1201 and the second bore 1202. The first bore 1201 can be configured to receive the pin 140 that includes the engagement surface 141. The coupler 1200 can be configured to connect to a first member, e.g., M1 described above, by placing, locating, or otherwise disposing the pin 140 within the first bore 1201 and the pair of corresponding bores defined by the pair of arms of the first member M1 or a clevis 110 connected to the first member M1. Similarly, the coupler 1200 can be connected to a second member, e.g., M2 described above, by placing, locating, or otherwise disposing a pin (for example pin 140 with or without the engagement surface) within the third bore 1203 and the pair of corresponding bores defined by the pair of arms of the second member M2 or a clevis 120 connected to the second member M2. The second bore 1202 can be configured to receive the wedge 150. The partial intersection of the first bore 1201 and the second bore 1202 can permit the engagement surface 151 of the wedge 150 to be in contact with the engagement surface 141 of the pin 140 when the pin 140 and the wedge 150 are disposed within the first and second bores 1201, 1202, respectively, such that the relative movement between the pin 140 and the coupler 1200 can be restricted or prevented.

In some embodiments, the first bore 1201 and the third bore 1203 can be orientated substantially orthogonal with respect to one another. In some embodiments, the first bore 1201 and the second bore 1202 can be orientated substantially orthogonal with respect to one another.

In some embodiments, the first bore 1201 can be free of any bushing between an inner surface of the first bore 1201 and the outer surface 142 of the pin 140 when the pin 140 is disposed within the first bore 1201. It has been found that by applying a sufficient amount of axial force to the wedge 150, the need for a bushing between the outer surface 142 of the pin 140 and the inner surface of the first bore 1201 can be eliminated. In other embodiments, the first bore 1201 can include a bushing disposed between the inner surface of the first bore 1201 and the outer surface 142 of the pin 140 when the pin 140 is disposed within the first bore 1201. In some embodiments, when a bushing is disposed within the first bore 1201 between the inner surface of the first bore 1201 and the outer surface 142 of the pin 140, the bushing can define a slot or other aperture partially therethrough to allow the engagement surface 151 of the wedge 150 to contact the engagement surface of 141 of the pin 140.

Figure 14:
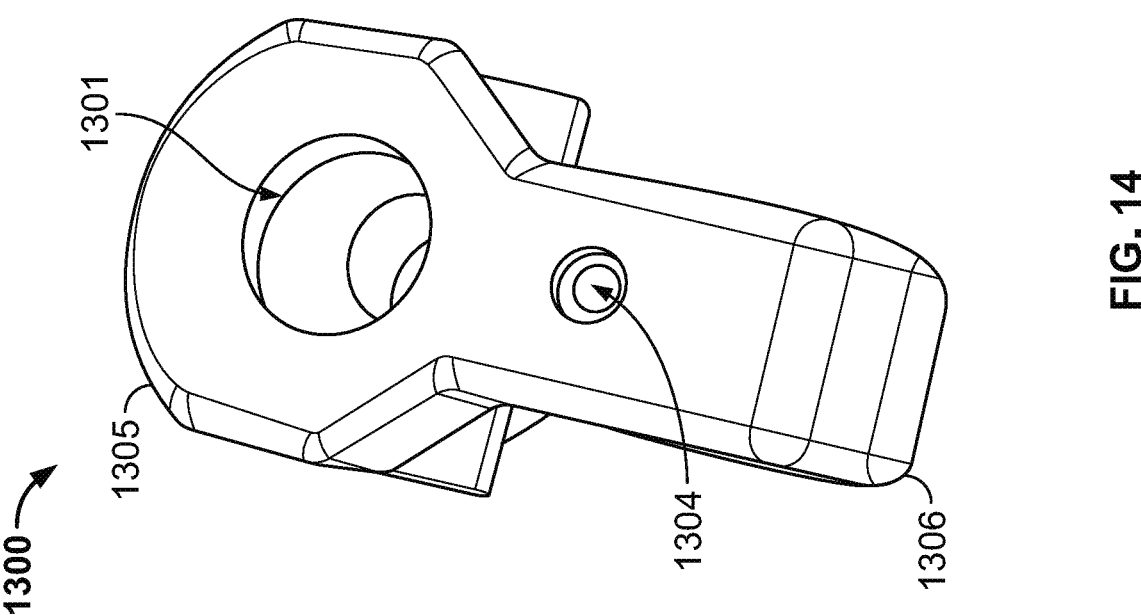
FIGS. 13 and 14 depict perspective views of an illustrative coupler that defines a groove at a first end of the coupler, according to one or more embodiments described.
Figure 13:
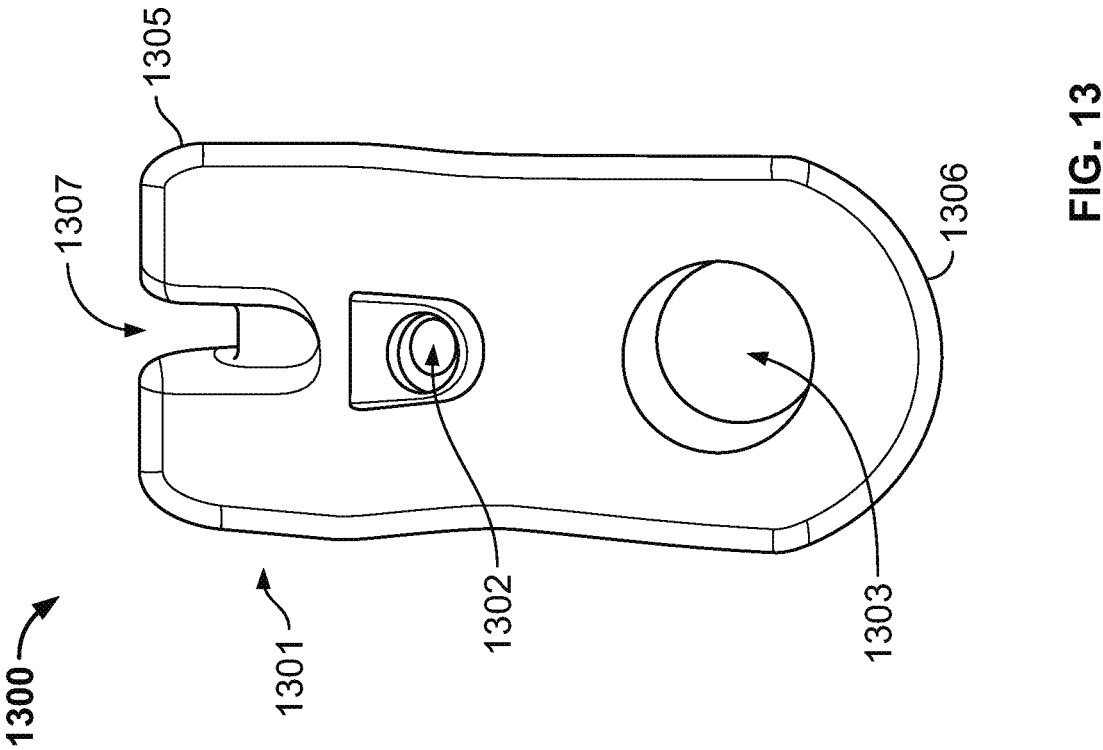

FIGS. 13 and 14 depict perspective views of an illustrative coupler 1300 that defines a groove 1307 at a first end of the coupler 1300, according to one or more embodiments. In some embodiments the coupler 1300 can define a first bore 1301 and a second bore 1302 disposed toward a first end thereof and a third bore 1303 and, optionally, a fourth bore 1304 disposed toward a second end thereof. In some embodiments, the first bore 1301 and the third bore 1303 defined by the coupler 1300 can each be completely therethrough and the second bore 1302 and the optional fourth bore 1304 defined by the coupler 1300 can be partially therethrough or completely therethrough. In some embodiments, the first bore 1301 and the third bore 1303 can be orientated substantially orthogonal with respect to one another. In some embodiments, the first bore 1301 and the second bore 1302 can be orientated substantially orthogonal with respect to one another. In some embodiments, the third bore 1303 and, if present, the optional fourth bore 1304 can be oriented substantially orthogonal with respect to one another.

The first bore 1301 and the second bore 1302 can partially intersect one another. When the coupler 1300 includes the optional fourth bore 1304, the third bore 1303 and the fourth bore 1304 can partially intersect one another. In some embodiments, the partial intersection between the first bore 1301 and the second bore 1302 can be centrally located, with respect to a length of the first bore 1301 between a first end and a second end thereof. In other embodiments, the partial intersection between the first bore 1301 and the second bore 1302 can be located closer to the first end or the second end of the first bore 1301 such that the partial intersection is not centered along a length of the first bore 1301. In some embodiments, when the optional fourth bore 1304 is present, the partial intersection between the third bore 1303 and the fourth bore 1304 can be centrally located, with respect to a length of the third bore 1303 between a first end and a second end thereof. In other embodiments, when the optional fourth is present, the partial intersection between the third bore 1303 and the fourth bore 1304 can be located closer to first end or the second end of the third bore 1303 such that the partial intersection is not centered along a length of the third bore 1303.

In some embodiments, the coupler 1300 can include a first lug 1305 disposed at the first end thereof and a second lug 1306 disposed at a second end thereof. The coupler 1300 can be connected to a first member, e.g., M1 described above, by placing, locating, or otherwise disposing the pin 140 within the first bore 1301 and the pair of corresponding bores defined by the first member M1 or a first clevis 110 connected to M1. Similarly, the coupler 1300 can be connected to a second member, e.g., M2 described above, by placing, locating, or otherwise disposing the pin 140 within the third bore 1303 and a pair of corresponding bores defined by the second member M2 or a second clevis 120 connected to M2. The second bore 1302 can be configured to receive the wedge 150. The partial intersection of the first bore 1301 and the second bore 1302 can permit the engagement surface 151 of the wedge 150 to be in contact with the engagement surface 141 of the pin 140 when the pin 140 and the wedge 150 are disposed within the first and second bores 1301, 1302, respectively, such that the relative movement between the pin 140 disposed within the first bore and the coupler 1300 can be restricted or prevented.

In some embodiments, the groove 1307 can be oriented substantially orthogonal to a longitudinal axis of the first bore 1301. In some embodiments, the first lug 1305 can define the groove 1307 as shown in FIG. 13. In other embodiments, the first lug 1305 can define the groove 1307 such that the groove 1307 and the first bore 1301 partially intersect one another, for example as shown in FIG. 7.

In some embodiments, the optional fourth bore 1304, when present, can be configured to receive a wedge 150. The partial intersection of the third bore 1303 and the fourth bore 1304 can permit the engagement surface 151 of the wedge 150 to be in contact with the engagement surface 141 of the pin 140 when the pin 140 and the wedge 150 are disposed within the third and fourth bores 1303, 1304, respectively, such that the relative movement between the pin 140 disposed within the third bore 1303 and the coupler 1300 can restricted or prevented.

In some embodiments, the first bore 1301 can be free of any bushing between an inner surface of the first bore 1301 and the outer surface 142 of the pin 140 when the pin 140 is disposed within the first bore 1301. In some embodiments, the third bore 1303 can be free of any bushing between an inner surface of the third bore 1303 and the outer surface 142 of the pin 140 when the pin 140 is disposed within the third bore 1303. In some embodiments, if a bushing is disposed within the first bore 1301 between the inner surface of the first bore 1301 and the outer surface 142 of the pin 140, the bushing can define a slot or other aperture partially therethrough to allow the engagement surface 151 of the wedge 150 to contact the engagement surface of 141 of the pin 140.

Figure 16:
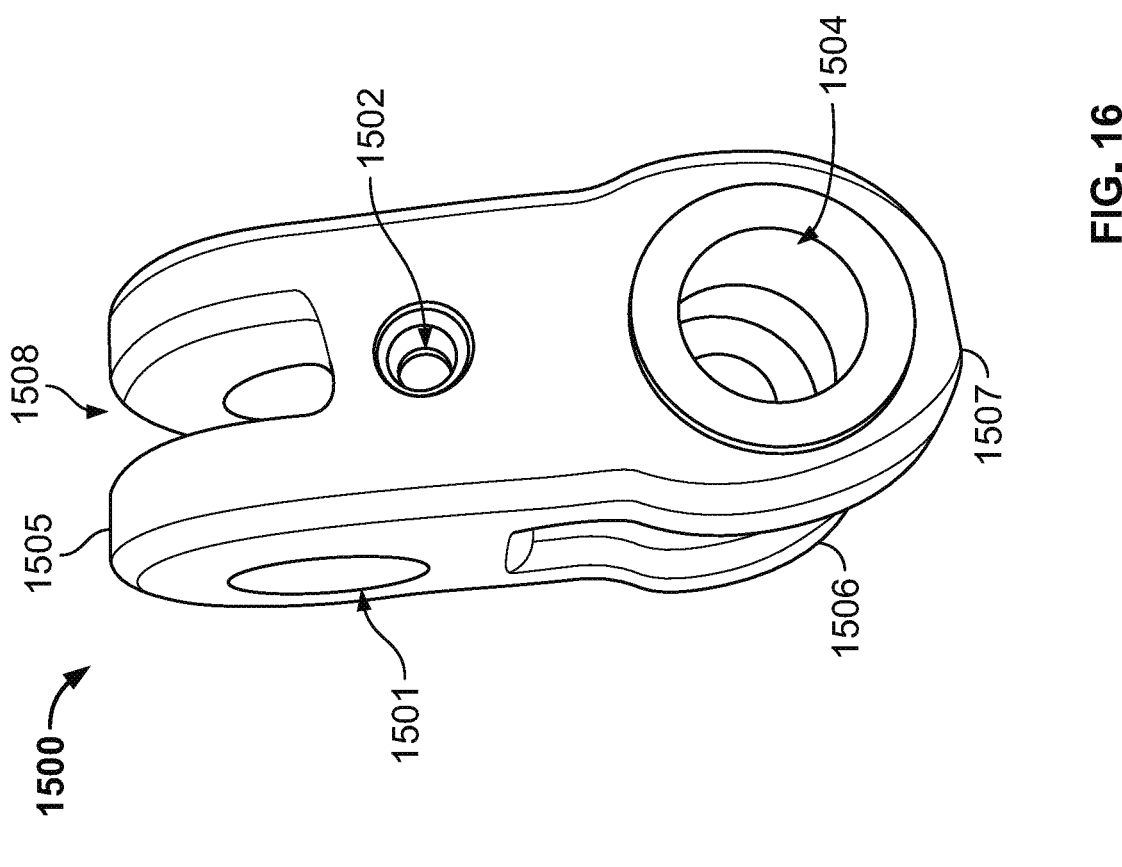
FIGS. 15 and 16 depict perspective views of an illustrative coupler that includes a lug at a first end thereof that defines a groove and a first bore that partially intersect one another and a pair of arms at a second end thereof that that defines a pair of axially aligned bores, according to one or more embodiments described.
Figure 15:
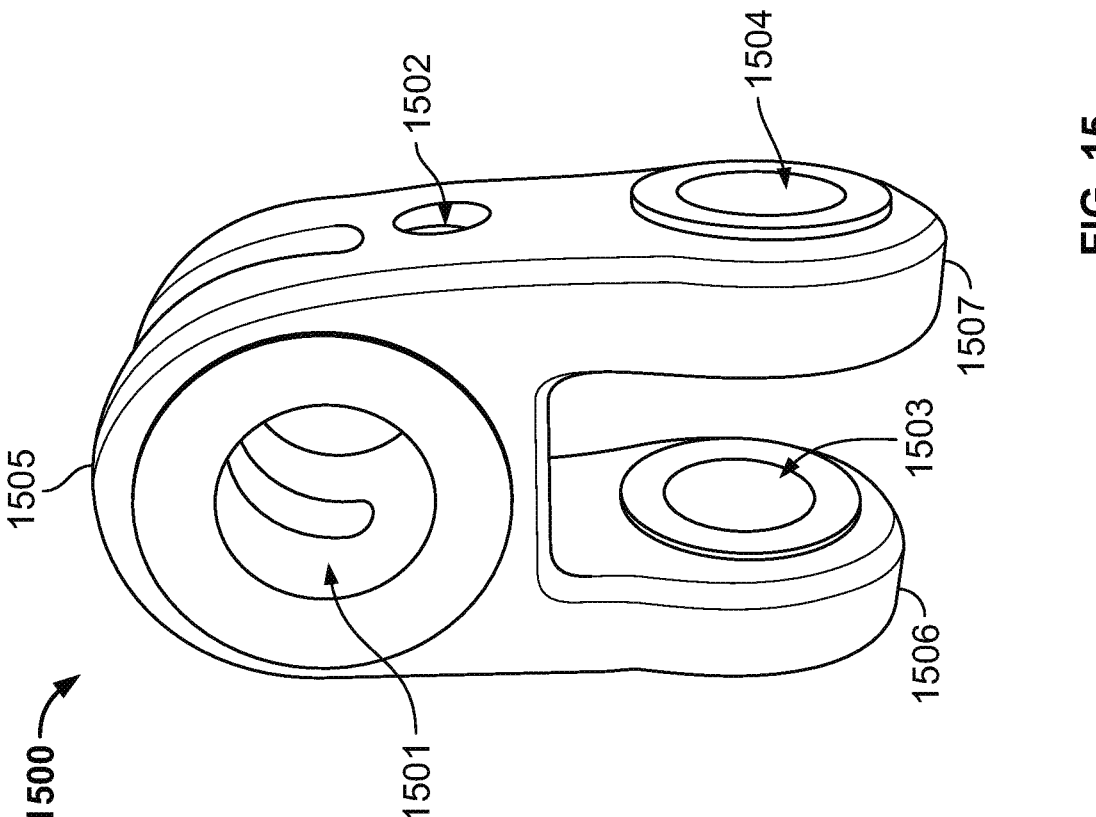

FIGS. 15 and 16 depict perspective views of an illustrative coupler 1500 that includes a lug 1505 at a first end thereof that defines a groove 1508 and a first bore 1501 that partially intersect one another and a pair of arms 1506, 1507 at a second end thereof that that define a pair of axially aligned bores 1503, 1504, according to one or more embodiments. The lug 1505 can define the first bore 1501 therethrough and a second bore 1502 at least partially therethrough. The first bore 1501 and the second bore 1502 can partially intersect one another. The groove 1508, as shown in FIGS. 15 and 16, can partially intersect the first bore 1501 such that a portion of an inner surface of the first bore 1501 extending from a first end to a second end thereof that is opposite the partial intersection of the first bore 1501 and the second bore 1502 is discontinuous. In other embodiments, however, the groove 1508 can be configured so that it does not intersect the first bore 1501, not shown, such that the inner surface of the first bore 1501 that is opposite the partial intersection of the first bore 1501 and the second bore 1502 is continuous.

The coupler 1500 can be connected to a first member, e.g., M1 described above, by placing, locating, or otherwise disposing a pin 140 within the first bore 1501 and a pair of corresponding bores defined by the first member M1 or a first clevis 110 connected to M1. Similarly, the coupler 1500 can be connected to a second member, e.g., M2 described above, by placing, locating or otherwise disposing a pin 140 within the pair of axially aligned bores 1503, 1504 defined by the pair of arms 1506, 1507 and a bore by the second member M2 or a lug 920 connected to M2.

In some embodiments, a central axis of the first bore 1501 and a central axis of the second bore 1502 defined by the coupler 1500 can be orientated substantially orthogonal with respect to one another. In some embodiments, a central axis of the first bore 1501 defined by the coupler 1500 and a central axis of the axially aligned bores 1503, 1504 defined by the pair of arms 1505, 1506 can be orientated substantially orthogonal with respect to one another.

In some embodiments, the first bore 1501 can be free of any bushing between an inner surface of the first bore 1501 and the outer surface 142 of the pin 140 when the pin 140 is disposed within the first bore 1501. It has been found that by applying a sufficient amount of axial force to the wedge 150, the need for a bushing between the outer surface 142 of the pin 140 and the inner surface of the first bore 1501 can be eliminated. In other embodiments, the bore 1501 can include a bushing disposed between the inner surface of the first bore 1501 and the outer surface 142 of the pin 140 when the pin 140 is disposed within the first bore 1501. In some embodiments, when a bushing is disposed within the first bore 1501 between the inner surface of the first bore 1501 and the outer surface 142 of the pin 140, the bushing can define a slot or other aperture partially therethrough to allow the engagement surface 151 of the wedge 150 to contact the engagement surface of 141 of the pin 140.

Figure 17:
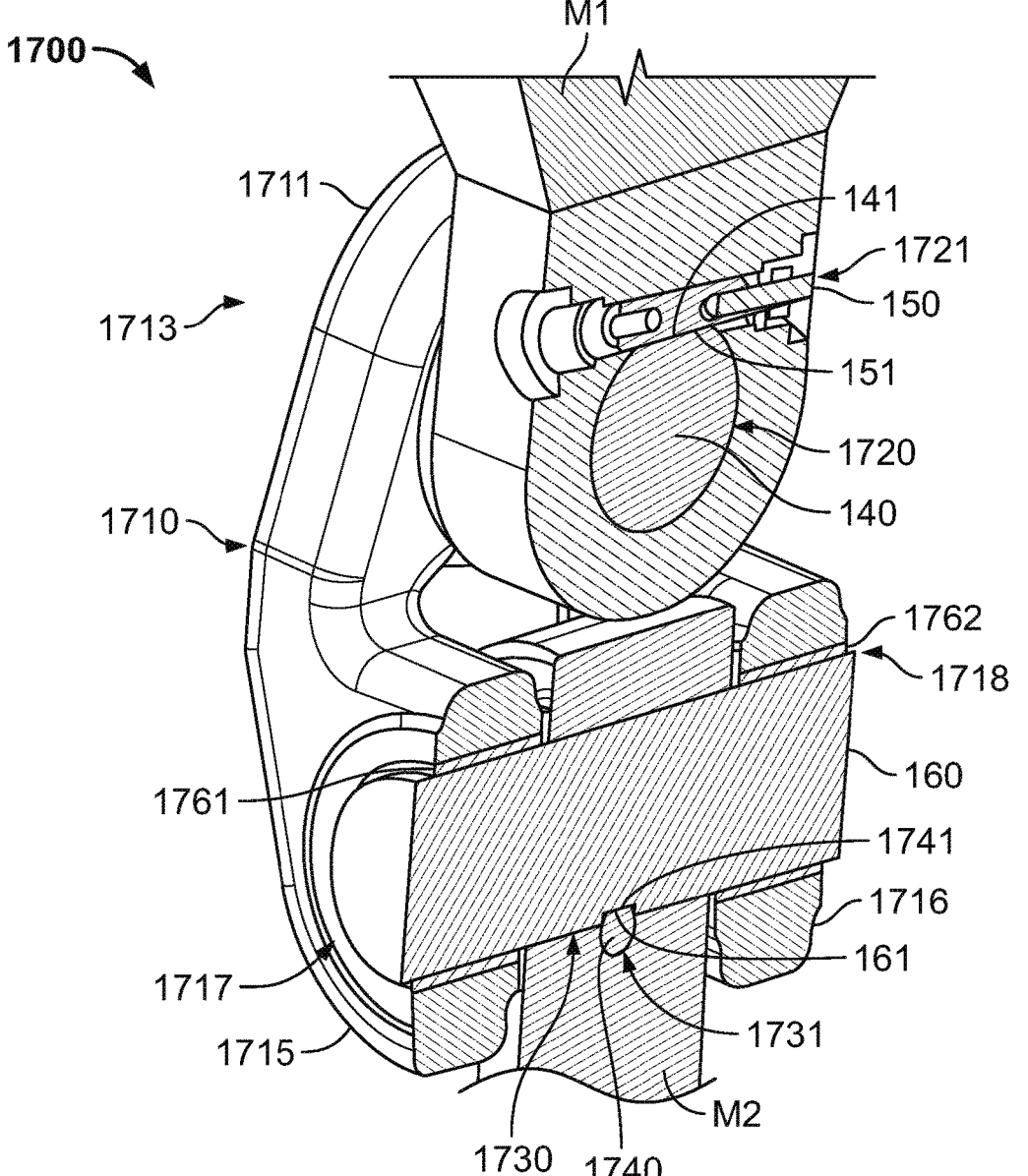
FIG. 17 depicts a cross-sectional view of a dual axis joint, according to one or more embodiments described.

FIG. 17 depicts a partial cross-sectional view of a dual axis joint 1700, according to one or more embodiments. The dual axis joint 1700 can be configured to provide an articulated connection about two axes of rotation between a first member M1 and a second member M2. The dual axis joint can include a coupler 1710, a first pin 140, a second pin 160, a first wedge 150 and a second wedge 1740.

The coupler 1710 can include a first pair of arms (one is shown, 1711) disposed toward a first end of the coupler 1710 that can define a first pair of axially aligned bores (the location of one, 1713, is located on the back side of arm 1711) and a second pair of arms 1715, 1716 disposed toward a second end of the coupler 1710 that can define a second pair of axially aligned bores 1717, 1718. In some embodiments, the first pair of axially aligned bores defined by the coupler 1710 and the second pair of axially aligned bores defined by the coupler 1710 can each be completely therethrough. In other embodiments, one of the bores defined by the first pair of arms and one of the bores defined by the second pair of arms can be completely therethrough and the other bore defined by the first pair of arms and/or the other bore defined by the second pair of arms can be partially therethrough.

The coupler 1710 can be connected to the first member M1 by placing, locating, or otherwise disposing a first pin 140 within the axially aligned bores (one is shown, 1713) defined by the first pair of arms (one is shown, 1711) of the coupler 1710 and a first bore 1720 defined by the first member M1. The coupler 1710 can be connected to the second member by placing, locating, or otherwise disposing a second pin 160 within the axially aligned bores 1717, 1718 defined by the second pair of arms 1715, 1716 of the coupler 1710 and a first bore 1730 defined the second member M2. The first member M1 can define a second bore 1721 configured to receive the first wedge 150 and the second member M2 can define a second bore 1731 configured to receive the second wedge 1740. The first and second bores 1720 and 1721 defined by the first member M1 can partially intersect one another. The first and second bores 1730 and 1731 defined by the second member M2 can partially intersect one another. In some embodiments, the dual axis joint 1700 can include the first wedge 150 disposed within the second bore 1721 defined by the first member M1 such that the engagement surface 151 of the first wedge 150 can be in contact with the engagement surface 141 of the first pin

140 to restrict or prevent relative movement between the first pin 140 and the first member M1. The dual axis joint 1700 can also include the second wedge 1740 disposed within the second bore 1731 defined by the second member M2 such that the engagement surface 1741 of the second wedge 1740 can be in contact with the engagement surface 161 of the second pin 160 to restrict relative movement between the second pin 160 and the second member M2. In some embodiments, a central axis of the first pair of axially aligned bores (one is shown, 1713) defined by the first pair of arms (one is shown, 1711) and a central axis of the second pair of axially aligned bores 1717, 1718 defined by the second pair of arms 1715, 1716 be orientated substantially orthogonal with respect to one another.

In some embodiments a bushing 1761, 1762 can be disposed between an inner surface of each bore defined by the second pair of arms 1717, 1718, respectively, and the external surface of the second pin 160. Similarly, in some embodiments, a bushing (not visible in FIG. 17) can be disposed between an inner surface of each bore defined by the first pair of arms (one arm is shown, 1711) and the external surface of the first pin 140. The bushings can be manufactured from bronze, brass, a polymer, a fiber reinforced composite material, or any other suitable material.

Figure 18:
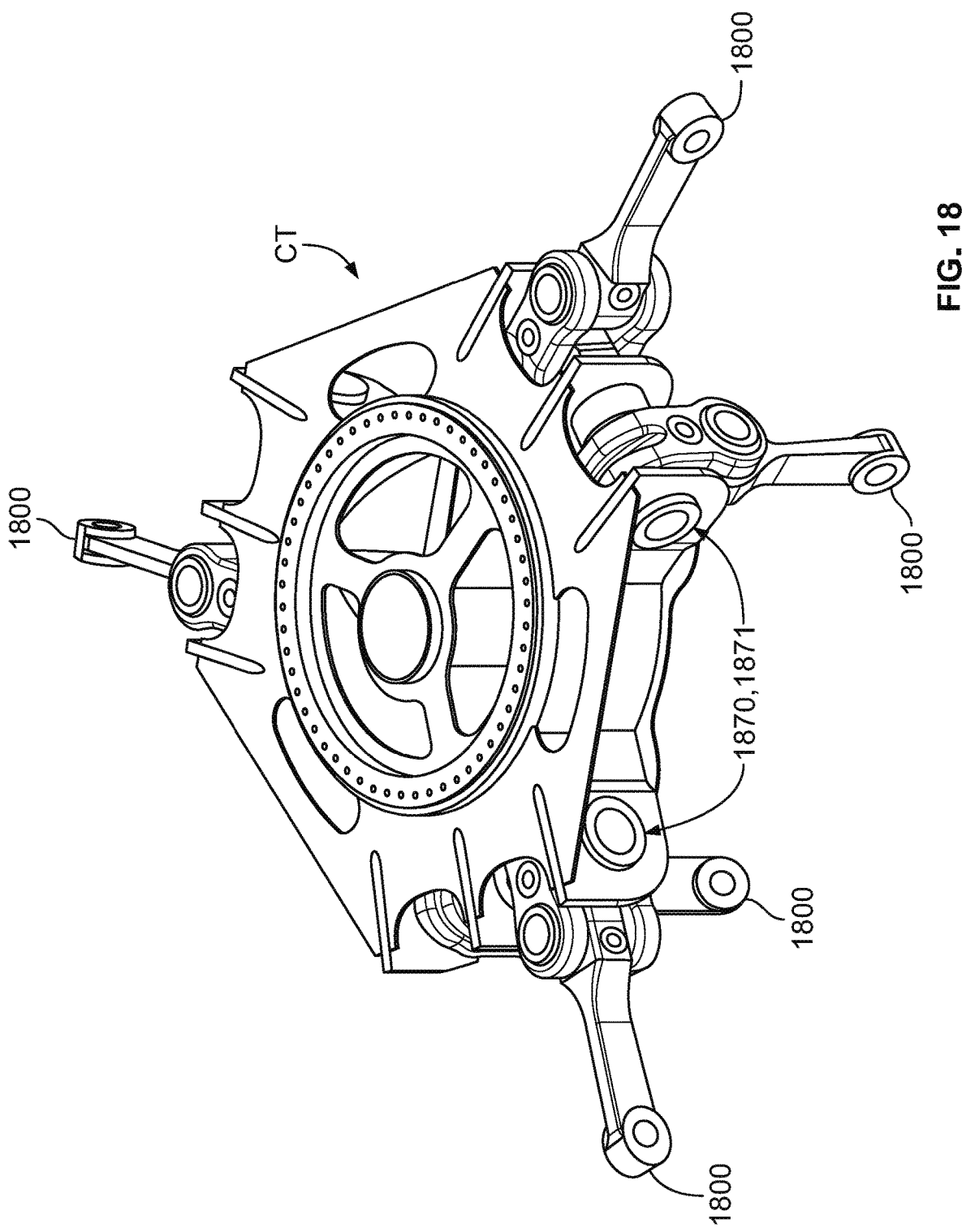
FIG. 18 depicts a perspective view of an illustrative chain table for a mooring turret that includes a plurality of dual axis joints connected thereto, according to one or more embodiments described.

FIG. 18 depicts a perspective view of an illustrative chain table CT that can be configured to connect to a mooring turret (not shown) having a plurality of dual axis joints 1800 connected thereto, according to one or more embodiments. The chain table CT can also be referred to as a first member that the plurality of dual axis joints 1800 can be configured to connect to at a first end thereof. The plurality of dual axis joints 1800 can also be configured to connect to a second member (not shown) at a second end thereof, such as a plurality of corresponding chains or other elongated members that can be configured to connect to a seabed or other mooring point.

Figure 20:
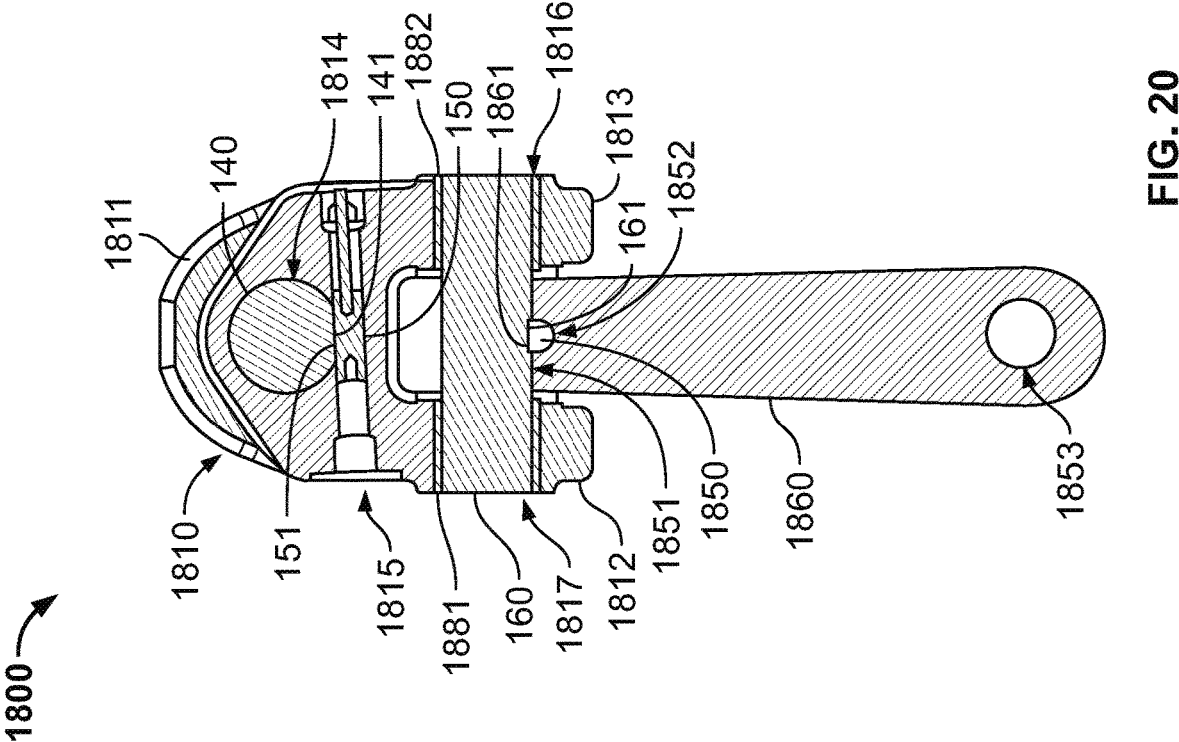
FIG. 20 depicts a cross-sectional view of the dual axis joint shown in FIG. 19.
Figure 19:
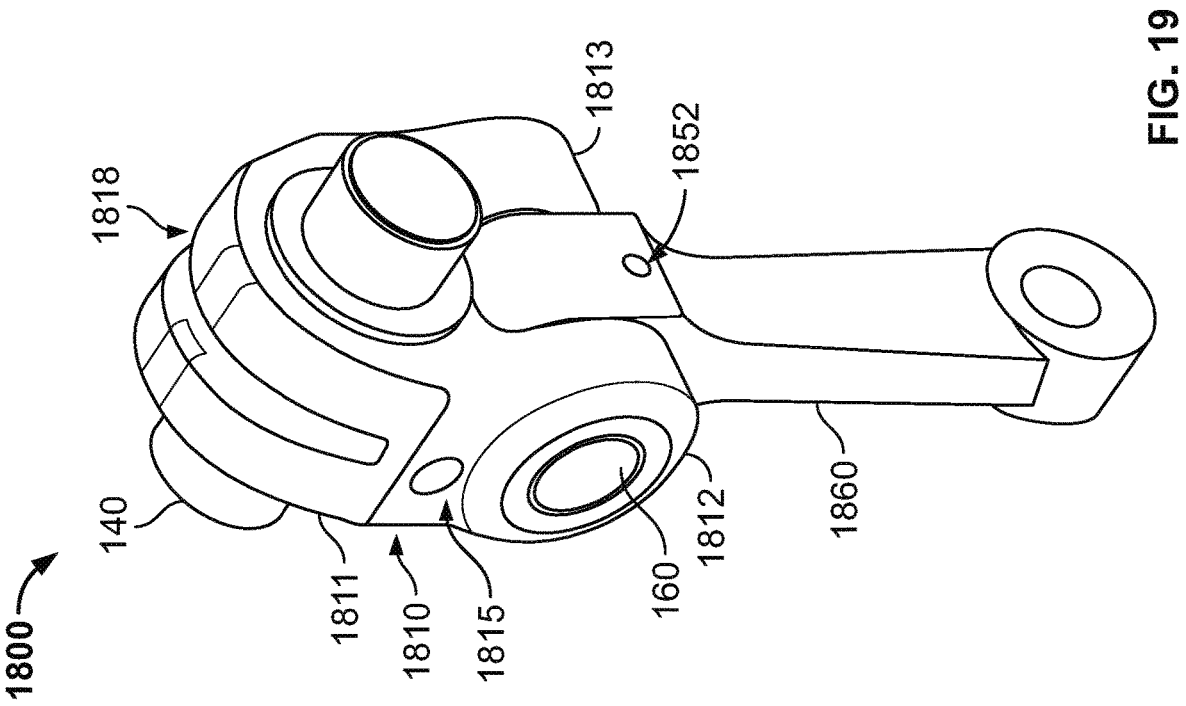
FIG. 19 depicts a perspective view of a dual axis joint, according to one or more embodiments described.

FIG. 19 depicts a perspective view of one of the dual axis joints 1800 shown in FIG. 18, according to one or more embodiments. FIG. 20 depicts a cross-sectional view of the dual axis joint 1800 shown in FIG. 19. The dual axis joint 1800 can include a coupler 1810, a first pin 140, a first wedge 150, a second pin 160, an arm 1860, and a second wedge 1850.

The coupler 1810 can include a lug 1811 disposed at a first end of the coupler 1810 and a pair of arms 1812, 1813 disposed at a second end of the coupler 1810. The lug 1811 can define a first bore 1814 therethrough and a second bore 1815 at least partially therethrough. The pair of arms 1812, 1813 can define a pair of axially aligned bores 1816 and 1817 therethrough. The first bore 1814 and the second bore 1815 defined by the coupler 1810 can partially intersect one another. In some embodiments, the coupler 1800 can also define a groove 1818 that can be orthogonal to a longitudinal axis of the first bore 1814. In some embodiments, the groove 1818 can partially intersect the first bore 1814 (not shown). In other embodiments, as shown, the groove 1818 does not intersect the first bore 1814 defined by the coupler 1800.

The first pin 140 can be disposed within the first bore 1814 and a corresponding pair of axially aligned bores 1870, 1871 defined by the chain table CT (shown in FIG. 18). The first pin 140 can have an engagement surface 141 formed on a portion of the external surface 142 of the first pin 140 between a first end 143 and a second end 144 of the first pin 140. The first wedge 150 can be disposed within the second bore 1815. The first wedge 150 can have an engagement surface 151 formed on an external surface 151 of the first wedge 150 between a first end 153 and a second end 154 of the first wedge 150. The engagement surface 151 of the first wedge 150 can contact the engagement surface 141 of the first pin 140 thereby restricting movement between the first pin 140 and the coupler 1810. In some embodiments, a central axis of the first bore 1814 defined by the coupler 1810 and a central axis of the axially aligned bores 1816, 1817 defined by the coupler 1810 can be orientated substantially orthogonal with respect to one another. In some embodiments, a central axis of the first bore 1814 defined by the coupler 1810 and a central axis of the second bore 1815 defined by the coupler 1810 can be orientated substantially orthogonal with respect to one another.

The arm 1860 can define a first bore 1851 therethrough and a second bore 1852 at least partially therethrough disposed toward a first end of the arm 1860 and a third bore 1853 therethrough disposed toward a second end of the arm 1860. The arm 1860 can be configured at the second end to receive, connect to, or otherwise be attached to a second member, e.g., a chain or other member. The connection between the second member and the arm 1850 can be made via a shackle, h-link, grommet, or other similar connection apparatus.

The second pin 160 can be disposed within the pair of axially aligned bores 1816, 1817 defined by the coupler 1810 and the first bore 1851 of the arm 1860. The second pin 160 can have an engagement surface 161 formed on a portion of the external surface of the second pin 160 between a first end and a second end of the second pin 160. The second wedge 1850 can be disposed within the second bore 1852 of the arm 1860. The second wedge 1850 can have an engagement surface 1861 formed on an external surface of the second wedge 1850 between a first end and a second end of the second wedge 1850. The engagement surface 1861 of the second wedge 1850 can contact the engagement surface 161 of the second pin 160 thereby restricting or preventing movement between the second pin 160 and the arm 1860.

In some embodiments, a central axis of the first bore 1851 defined by the arm 1860 and a central axis of third bore 1853 defined by the arm 1860 can be orientated substantially orthogonal with respect to one another. In some embodiments, a central axis of the first bore 1851 defined by the arm 1860 and a central axis of second bore 1852 defined by the arm 1860 can be orientated substantially orthogonal with respect to one another.

In some embodiments a bushing 1881, 1882 can be disposed between an inner surface of each bore 1817, 1816 defined by the pair of arms 1812, 1813, respectively, and the external surface 162 of the second pin 160. Similarly, in some embodiments, a pair of bushings (not visible) can be disposed between an inner surface of each bore 1870, 1871 defined by the CT and the external surface 142 of the first pin 140. The bushings can be manufactured from bronze, brass, a polymer, a fiber reinforced composite material, or any other suitable material The present disclosure further relates to any one or more of the following numbered embodiments:

1. A coupler configured to provide an articulated connection about two axes of rotation between a first member and a second member, comprising a first end that defines a first bore therethrough and a second bore at least partially therethrough, wherein the first bore and the second bore partially intersect one another; and a second end that defines a third bore therethrough.

2. The coupler of paragraph 1, wherein a central axis through the first bore and a central axis through the second bore are substantially orthogonal to one another.

3. The coupler of paragraph 1 or paragraph 2, wherein, a central axis through the first bore and a central axis through the third bore are substantially orthogonal to one another.

4. The coupler of any one of paragraphs 1 to 3, wherein the first end comprises a lug such that at least a portion of an inner surface of the first bore extending from a first end to a second end thereof is continuous, and wherein the second end comprises a lug such that at least a portion of an inner surface of the third bore extending from a first end to a second end thereof is continuous.

5. The coupler of any one of paragraphs 1 to 4, wherein the first end defines a groove that is substantially orthogonal to a central axis of the first bore.

6. The coupler of paragraphs 4 or 5, wherein the groove partially intersects the first bore such that a portion of an inner surface of the first bore extending from a first end to a second end thereof that is opposite the partial intersection of the first and second bores is discontinuous.

7. The coupler of any of one paragraphs 1 to 6, wherein the first bore is configured to receive a pin comprising an engagement surface formed on a portion of an external surface of the first pin between a first end and a second end thereof, the second bore is configured to receive a wedge comprising an engagement surface formed on a portion of an external surface of the wedge between a first end and a second end thereof, and the partial intersection between the first bore and the second bore is configured to permit the engagement surface of the wedge to contact the engagement surface of the pin when the pin and the wedge are disposed within the first and second bores, respectively.

8. The coupler of any one of paragraphs 1 to 6, further comprising a first pin disposed within the first bore of the coupler, wherein the first pin comprises an engagement surface formed on a portion of an external surface of the first pin between a first end and a second end thereof; and a first wedge disposed within the second bore, wherein the first wedge comprises an engagement surface formed on a portion of an external surface of the first wedge between a first end and a second end thereof, and wherein the partial intersection between the first bore and the second bore permits the engagement surface of the first wedge to contact the engagement surface of the first pin thereby restricting relative movement between the first pin and the coupler.

9. The coupler of paragraph 8, further comprising a second pin disposed within the third bore of the coupler.

10. The coupler of any one of paragraphs 1 to 9, wherein the second end of the coupler further defines a fourth bore at least partially therethrough configured to receive a second wedge comprising an engagement surface formed on a portion of an external surface of the second wedge between a first end and a second end thereof, the third bore and the fourth bore partially intersect one another, a central axis through the third bore and a central axis through the fourth bore are substantially orthogonal to one another, and the partial intersection between the third bore and the fourth bore is configured to permit the engagement surface of the second wedge to contact the engagement surface of the pin when the pin and the wedge are disposed within the third and fourth bores, respectively.

11. The coupler of any one of paragraphs 1-6 or 8, wherein the second end of the coupler further defines a fourth bore at least partially therethrough, and wherein the third bore and the fourth bore partially intersect one another; the coupler further comprising a second pin disposed within the third bore of the coupler, wherein the second pin comprises an engagement surface formed on a portion of an external surface of the second pin between a first end and a second end thereof, a second wedge disposed within the fourth bore, wherein the second wedge comprises an engagement surface formed on a portion of an external surface of the second wedge between a first end and a second end thereof, and wherein the partial intersection between the third bore and the fourth bore permits the engagement surface of the second wedge to contact the engagement surface of the second pin thereby restricting relative movement between the second pin and the coupler.

12. The coupler of paragraph 1, wherein the first end comprises a lug and the second end comprises a pair of arms, wherein the pair of arms define axially aligned bores therethrough such that the third bore is defined by the pair of arms, and wherein the lug defines the first bore therethrough and the second bore at least partially therethrough.

13. The coupler of paragraph 12, wherein a central axis through the first bore and a central axis through the second bore are substantially orthogonal to one another.

14. The coupler of paragraph 12 or paragraph 13, wherein at least a portion of an inner surface of the first bore extending from a first end to a second end thereof is continuous.

15. The coupler of any one of paragraphs 12 to 14, wherein the first end defines a groove that is substantially orthogonal to a central axis of the first bore.

16. The coupler of paragraph 15, wherein the groove partially intersects the first bore such that a portion of an inner surface of the first bore extending from a first end to a second end thereof that is opposite the partial intersection of the first and second bores is discontinuous.

17. The coupler of any one of paragraphs 12 to 16, wherein: the first bore is configured to receive a first pin comprising an engagement surface formed on a portion of an external surface of the first pin between a first end and a second end thereof, the second bore is configured to receive a first wedge comprising an engagement surface formed on a portion of an external surface of the first wedge between a first end and a second end thereof, and the partial intersection between the first bore and the second bore is configured to permit the engagement surface of the first wedge to contact the engagement surface of the first pin when the first pin and the first wedge are disposed within the first and second bores, respectively.

18. The coupler of any one of paragraphs 12 to 16, further comprising:

a first pin disposed within the first bore of the coupler, wherein the first pin comprises an engagement surface formed on a portion of an external surface of the first pin between a first end and a second end thereof; and a first wedge disposed within the second bore, wherein the first wedge comprises an engagement surface formed on a portion of an external surface of the first wedge between a first end and a second end thereof, and wherein the partial intersection between the first bore and the second bore permits the engagement surface of the first wedge to contact the engagement surface of the first pin thereby restricting relative movement between the first pin and the coupler.

19. A dual axis joint, comprising: a coupler comprising a lug disposed at a first end thereof and a pair of arms disposed at a second end thereof, wherein the lug defines a first bore therethrough and a second bore at least partially therethrough, wherein the first bore and the second bore partially intersect one another, and wherein the pair of arms define a pair of axially aligned bores therethrough, a first pin disposed within the first bore, wherein the first pin comprises an engagement surface formed on a portion of an external surface of the first pin between a first end and a second end thereof, a first wedge disposed within the second bore, wherein the first wedge comprises an engagement surface formed on a portion of an external surface of the first wedge between a first end and a second end thereof, and wherein the engagement surface of the first wedge contacts the engagement surface of the first pin thereby restricting relative movement between the first pin and the coupler, an arm defining a first bore therethrough and a second bore at least partially therethrough, wherein the first bore defined by the arm and the second bore defined by the arm are disposed toward a first end of the arm, a second pin disposed within the pair of axially aligned bores defined by the pair of arms of the coupler and the first bore defined by the arm, wherein the second pin comprises an engagement surface formed on a portion of an external surface of the second pin between a first end and a second end thereof, and a second wedge disposed within the second bore defined by the arm, wherein the second wedge comprises an engagement surface formed on a portion of an external surface of the second wedge between a first end and a second end thereof, and wherein the engagement surface of the second wedge contacts the engagement surface of the second pin thereby restricting relative movement between the second pin and the arm.

20. The dual axis joint of paragraph 20, wherein a central axis through the first bore defined by the lug and a central axis through the pair of axially aligned bores defined by the pair of arms are substantially orthogonal to one another.

21. The dual axis joint of paragraph 19 or paragraph 20, wherein a central axis through the first bore defined by the lug and a central axis through the second bore defined by the lug are substantially orthogonal to one another.

22. The dual axis joint of any one of paragraphs 19 to 21, wherein a central axis through the first bore of the arm and a central axis through the second bore of the arm are substantially orthogonal to one another.

23. The dual axis joint of any one of paragraphs 19 to 22, wherein the first end of the lug defines a groove that is substantially orthogonal to a central axis of the first bore.

24. A dual axis joint, comprising: a first clevis comprising a pair of arms that define axially aligned bores therethrough; a second clevis comprising a pair of arms that define axially aligned bores therethrough; a coupler that defines a first bore therethrough, a second bore at least partially therethrough, and a third bore therethrough, wherein the first and second bores are disposed toward a first end of the coupler and the third bore is disposed toward a second end of the coupler; a first pin disposed within the bores of the first clevis and the first bore, wherein the first pin comprises an engagement surface formed on a portion of an external surface of the first pin between a first end and a second end thereof; a wedge disposed within the second bore, wherein the wedge comprises an engagement surface formed on a portion of an external surface of the wedge between a first end and a second end thereof, and wherein the engagement surface of the wedge contacts the engagement surface of the first pin thereby restricting relative movement between the first pin and the coupler; and a second pin disposed within the bores of the second clevis and the third bore.

25. The dual axis joint of paragraph 24, wherein a central axis through the first bore and a central axis through the third bore are not parallel and do not intersect one another.

26. The dual axis joint of paragraph 24 or paragraph 25, wherein a central axis through the first bore lies in a first plane and a central axis through the third bore lies in a second plane, wherein the first and second planes are parallel with respect to one another, and wherein the central axis through the first bore and the central axis through the third bore are orientated at 90 degrees with respect to one another when viewed along an axis that is normal to the first and second planes.

27. The dual axis joint of any one of paragraphs 24 to 26, wherein a thickness of a first end of the wedge is less than a thickness of a second end of the wedge such that the engagement surface of the wedge is tapered along a longitudinal axis of the wedge.

28. The dual axis joint of any one of paragraphs 24 to 27, wherein a force is applied to the wedge to position at least a portion of the engagement surface of the wedge in contact with at least a portion of the engagement surface of the first pin.

29. The dual axis joint of paragraph 28, wherein the force applied to the wedge is sufficient to preload the first pin in a direction opposing a load on the first pin when the dual axis joint is subjected to an external tensile load.

30. The dual axis joint of any one of paragraphs 24 to 29, wherein the first end of the coupler comprises a pair of arms that define axially aligned bores therethrough such that the first bore is defined by the pair of arms of the first end of the coupler.

31. The dual axis joint of any one of paragraphs 24 to 27, wherein: the first end of the coupler comprises a pair of arms that define axially aligned bores therethrough such that the first bore is defined by the pair of arms of the first end of the coupler, a force is applied to the wedge to position at least a portion of the engagement surface of the wedge in contact with at least a portion of the engagement surface of the first pin, and the pair of arms of the first end of the coupler bend away from one another when the first pin is preloaded.

32. The dual axis joint of any one of paragraphs 24 to 31, wherein: the wedge comprises a generally cylindrical body having a first end and a second end, the engagement surface of the wedge is disposed at least partially along a length of the generally cylindrical body between the first and second ends thereof, and at least a portion of the first end, the second end, or the first and second ends of the wedge has a frustoconical outer surface.

33. The dual axis joint of any one of paragraphs 1 to 32, further comprising a pair of bushings, each bushing disposed between an outer surface of the first pin and an inner surface of each arm of the first clevis that define the axially aligned bores therethrough, and wherein an inner surface of the first end of the coupler that defines the first bore therethrough is in direct contact with an outer surface of the first pin.

34. The dual axis joint of any one of paragraphs 24 to 33, wherein an outer surface of the first pin is in direct contact with an inner surface of the coupler that defines the first bore.

35. The dual axis joint of any one of paragraphs 24 to 34, further comprising a bushing disposed between an outer surface of the first pin and an inner surface of the coupler that defines the first bore.

36. The dual axis joint of any one of paragraphs 24 to 35, wherein the coupler further defines a fourth bore at least partially therethrough and disposed toward the second end thereof, the dual axis joint further comprising a second wedge disposed within the fourth bore, wherein: the second wedge comprises an engagement surface formed on a portion of an external surface of the second wedge between a first end and a second end thereof, the second pin further comprises an engagement surface formed on a portion of an external surface of the second pin between a first end and second end thereof, and the engagement surface of the second wedge contacts the engagement surface of the second pin thereby restricting relative movement between the second pin and the coupler.

37. The dual axis joint of paragraph 36, wherein a thickness of a first end of the second wedge is less than a thickness of a second end of the second wedge such that the engagement surface of the second wedge is tapered along a longitudinal axis of the second wedge.

38. The dual axis joint of paragraph 36 or paragraph 37, wherein a force is applied to the second wedge to position at least a portion of the engagement surface formed on the portion of the external surface of the second pin in contact with at least a portion of the engagement surface of the second wedge.

39. The dual axis joint of paragraph 38, wherein the force applied to the second wedge is sufficient to preload the second pin in a direction opposing a load on the second pin when the dual axis joint is subjected to an external tensile load.

40. The dual axis joint of any one of paragraphs 36 to 39, further comprising a second pair of bushings disposed between an outer surface of the second pin and an inner surface of each arm of the second clevis that define the axially aligned bores therethrough, and wherein an inner surface of the second end of the coupler that defines the fourth bore therethrough is in direct contact with an outer surface of the second pin.

41. The dual axis joint of any one of paragraphs 24 to 40, wherein the first and second ends of the second pin and the second clevis are free of any mechanical structure configured to retain the second pin within the bores of the second clevis, or wherein the first and second ends of the first pin and the first clevis are free of any mechanical structure configured to retain the first pin within the bores of the first clevis, or wherein the first and second ends of the first pin, the first and second ends of the second pin, the first clevis and the second clevis are free from any mechanical structure configured to retain the first pin and within the first clevis and the second pin within the second clevis.

42. The dual axis joint of any one of paragraphs 24 to 41, wherein the second end of the coupler comprises a pair of arms, and wherein the pair of arms of the second end of the coupler define axially aligned bores therethrough.

43. The dual axis joint of any one of paragraphs 36 to 42, wherein the first wedge and the second wedge are each located between the first pin and the second pin or wherein the first wedge is located between the first pin and the second pin and the second wedge is located on a side of the second pin that is opposite the first pin.

44. A dual axis joint, comprising: a first clevis comprising a pair of arms that define axially aligned bores therethrough; a second clevis comprising a pair of arms that define axially aligned bores therethrough; a coupler that defines a first bore therethrough, a second bore at least partially therethrough, a third bore therethrough, and a fourth bore at least partially therethrough, wherein: the first and second bores are disposed toward a first end of the coupler and the third and fourth bores are disposed toward a second end of the coupler, the first end of the coupler comprises a pair of arms that define axially aligned bores therethrough such that the first bore is defined by the pair of arms of the first end of the coupler, a central axis through the axially aligned bores of the first end of the coupler lies in a first plane and a central axis through the third bore lies in a second plane, the first and second planes are parallel with respect to one another, and the central axis through the axially aligned bores of the first end of the coupler and the central axis through the third bore are orientated at 90 degrees with respect to one another when viewed along an axis that is normal to the first and second planes; a first pin disposed within the bores of the first clevis and the first bore, wherein the first pin comprises an engagement surface formed on a portion of an external surface of the first pin between a first end and a second end thereof; a first wedge disposed within the second bore, wherein the first wedge comprises an engagement surface formed on a portion of an external surface of the first wedge between a first end and a second end thereof, and wherein the engagement surface of the first wedge contacts the engagement surface of the first pin thereby restricting relative movement between the first pin and the coupler; a second pin disposed within the bores of the second clevis and the third bore, wherein the second pin comprises an engagement surface formed on a portion of an external surface of the second pin between a first end and a second end thereof; a second wedge disposed within the fourth bore, wherein the second wedge comprises an engagement surface formed on a portion of an external surface of the second wedge between a first end and a second end thereof, and wherein the engagement surface of the second wedge contacts the engagement surface of the second pin thereby restricting relative movement between the second pin and the coupler; a first pair of bushings disposed between an outer surface of the first pin and an inner surface of each arm of the first clevis that define the axially aligned bores therethrough; a second pair of bushings disposed between an outer surface of the second pin and an inner surface of each arm of the second clevis that define the axially aligned bores therethrough, wherein an inner surface of the pair of arms that define the axially aligned bores through the first end of the coupler is in direct contact with an outer surface of the first pin, and wherein an inner surface of the second end of the coupler that defines the third bore is in direct contact with an outer surface of the second pin.

45. The dual axis joint of paragraph 44, wherein the first and second ends of the second pin and the second clevis are free of any mechanical structure configured to retain the second pin within the bores of the second clevis and the third bore, or wherein the first and second ends of the first pin and the first clevis are free of any mechanical structure configured to retain the first pin within the bores of the first clevis and the first bore, or wherein the first and second ends of the first pin, the first and second ends of the second pin, the first clevis and the second clevis are free from any mechanical structure configured to retain the first pin within the bores of the first clevis and the first bore and the second pin within the bores of the second clevis and the third bore.

46. A dual axis joint, comprising: a clevis comprising a pair of arms that define axially aligned bores therethrough; a lug that defines a first bore therethrough and a second bore at least partially therethrough; a coupler that defines a first bore therethrough, a second bore at least partially therethrough, and a third bore therethrough, wherein the first and second bores are disposed toward a first end of the coupler and the third bore is disposed toward a second end of the coupler, wherein the coupler comprises a first pair of arms disposed toward a first end of the coupler that define axially aligned bores therethrough such that the first bore is defined by the pair of arms of the first end of the coupler and a second pair of arms is disposed toward a second end of the coupler such that the third bore is defined by the pair of arms of the second end of the coupler, wherein a central axis through the first bore lies in a first plane and a central axis through the third bore lies in a second plane, wherein the first and second planes are parallel with respect to one another, and wherein the central axis through the first bore and the central axis through the second bore are orientated at 90 degrees with respect to one another when viewed along an axis that is normal to the first and second planes; a first pin disposed within the bores of the clevis and the first bore defined by the coupler, wherein the first pin comprises an engagement surface formed on a portion of an external surface of the first pin between a first end and a second end thereof; a first wedge disposed within the second bore defined by the coupler, wherein the first wedge comprises an engagement surface formed on a portion of an external surface of the first wedge between a first end and a second end thereof, and wherein the engagement surface of the first wedge contacts the engagement surface of the first pin thereby restricting relative movement between the first pin and the coupler, a second pin disposed within the first bore defined by the lug and the third bore defined by the coupler, wherein the second pin comprises an engagement surface formed on a portion of an external surface of the second pin between a first end and a second end thereof; a second wedge disposed within the second bore defined by the lug, wherein the second wedge comprises an engagement surface formed on a portion of an external surface of the second wedge between a first end and a second end thereof, and wherein the engagement surface of the second wedge contacts the engagement surface of the second pin thereby restricting relative movement between the second pin and the coupler.

47. The dual axis joint of paragraph 46, further comprising a first pair of bushings disposed between an outer surface of the first pin and an inner surface of each arm of the clevis that define the axially aligned bores therethrough; a second pair of bushings disposed between an outer surface of the second pin and an inner surface of each arm of the second pair of arms of the coupler that define axially aligned bores; wherein an inner surface of the first end of the coupler that defines the first bore is in direct contact with an outer surface of the first pin, and wherein and an inner surface of the lug that defines the first bore is in direct contact with an outer surface of the second pin.

48. The dual axis joint of paragraph 46 or paragraph 47, wherein the first and second ends of the second pin and the second clevis are free of any mechanical structure configured to retain the second pin within the bores of the second pair of arms of the coupler, or wherein the first and second ends of the first pin and the first clevis are free of any mechanical structure configured to retain the first pin within the bores of the first clevis, or wherein the first and second ends of the first pin, the first and second ends of the second pin, the first clevis and the second pair of arms of the coupler are free from any mechanical structure configured to retain the first pin and within the first clevis and the second pin within the second clevis.

49. The dual axis joint of any one of paragraphs 46 to 48, wherein axial movement of the first pin within the bores of the first pair of arms and the first bore is limited by the wedge such that the first and second ends of the first pin are free of any mechanical structure configured to retain the first pin within the bores of the first pair of arms.

50. A dual axis joint, comprising: a first lug that defines a first bore therethrough and a second bore at least partially therethrough; a second lug that defines a first bore therethrough; a coupler comprising a first pair of arms disposed toward a first end of the coupler that define axially aligned bores therethrough and a second pair of arms disposed toward a second end of the coupler that define axially aligned bores therethrough, wherein: a central axis through the axially aligned bores of the first pair of arms lies in a first plane and a central axis through the axially aligned bores of the second pair of arms lies in a second plane, the first and second planes are parallel with respect to one another, and the central axis through the axially aligned bores of the first pair of arms and the central axis through the axially aligned bores of the second pair of arms are orientated at 90 degrees with respect to one another when viewed along an axis that is normal to the first and second planes; a first pin disposed within the first bore defined by the first lug and the bores defined by the first pair of arms of the coupler, wherein the first pin comprises an engagement surface formed on a portion of an external surface of the first pin between a first end and a second end thereof; a first wedge disposed within the second bore defined by the first lug, wherein the first wedge comprises an engagement surface formed on a portion of an external surface of the first wedge between a first end and a second end thereof, and wherein the engagement surface of the first wedge contacts the engagement surface of the first pin thereby restricting relative movement between the first pin and the first lug, a second pin disposed within the first bore defined by the second lug and the bores defined by the second pair of arms of the coupler.

51. The dual axis joint of paragraph 50, wherein the second lug defines a second bore at least partially therethrough and the second pin comprises an engagement surface formed on a portion of an external surface of the second pin between a first and a second end thereof, further comprising a second wedge disposed within the second bore defined by the second lug, wherein the second wedge comprises an engagement surface formed on a portion of an external surface of the second wedge between a first end and a second end thereof, and wherein the engagement surface of the second wedge contacts the engagement surface of the second pin thereby restricting relative movement between the second pin and the second lug.

52. The dual axis joint of paragraph 50 or paragraph 51, further comprising a pair of bushings disposed between the external surface of the first pin and an inner surface of each arm of the first pair of arms of the coupler that define the axially aligned bores, wherein an inner surface of the first lug that defines the first bore of the first lug is in direct contact with the external surface of the first pin.

53. The dual axis joint of paragraph 50 or paragraph 51, further comprising a first pair of bushings disposed between the external surface of the first pin and an inner surface of each arm of the first pair of arms of the coupler that define the axially aligned bores; a second pair of bushings disposed between the external surface of the second pin and an inner surface of each arm of the second pair of arms of the coupler that define the axially aligned bores, wherein an inner surface of the first lug that defines the first bore of the first lug is in direct contact with the external surface of the first pin, and wherein and an inner surface of the second lug that defines the first bore of the second lug is in direct contact with the external surface of the second pin.

54. The dual axis joint of any one of paragraphs 50 to 53, wherein the first and second ends of the first pin and the first pair of arms of the coupler are free of any mechanical structure configured to retain the first pin within the bores of the second pair of arms of the coupler, or wherein the first and second ends of the second pin and the second pair of arms of the coupler are free of any mechanical structure configured to retain the second pin within the bores of the second pair of arms, or wherein the first and second ends of the first pin, the first and second ends of the second pin, the first pair of arms of the coupler and the second pair of arms of the coupler are free from any mechanical structure configured to retain the first pin and within the first pair of arms and the second pin within the second pair of arms.

55. A dual axis joint, comprising: a clevis comprising a pair of arms that define axially aligned bores therethrough; a lug that defines a bore therethrough; a coupler that defines a first bore therethrough, a second bore at least partially therethrough, and a third bore therethrough, wherein the first and second bores are disposed toward a first end of the coupler and the third bore is disposed toward a second end of the coupler, wherein the coupler comprises a pair of arms disposed toward a second end of the coupler such that the third bore is defined by the pair of arms of the second end of the coupler; a first pin disposed within the bores defined by the clevis and the first bore defined by the coupler, wherein the first pin comprises an engagement surface formed on a portion of an external surface of the first pin between a first end and a second end thereof; a wedge disposed within the second bore defined by the coupler, wherein the wedge comprises an engagement surface formed on a portion of an external surface of the first wedge between a first end and a second end thereof, and wherein the engagement surface of the first wedge contacts the engagement surface of the first pin thereby restricting relative movement between the first pin and the coupler; and a second pin disposed within the bore defined by the lug and the third bore defined by the coupler.

56. A dual axis joint, comprising: a first lug that defines a first bore therethrough and a second bore at least partially therethrough; a second lug that defines a first bore therethrough; a coupler comprising a first pair of arms disposed toward a first end of the coupler that define axially aligned bores therethrough and a second pair of arms disposed toward a second end of the coupler that define axially aligned bores therethrough; a first pin disposed within the first bore defined by the first lug and the bores defined by the first pair of arms of the coupler, wherein the first pin comprises an engagement surface formed on a portion of an external surface of the first pin between a first end and a second end thereof; a wedge disposed within the second bore defined by the first lug, wherein the first wedge comprises an engagement surface formed on a portion of an external surface of the first wedge between a first end and a second end thereof, and wherein the engagement surface of the first wedge contacts the engagement surface of the first pin thereby restricting relative movement between the first pin and the first lug; and a second pin disposed within the first bore defined by the second lug and the bores defined by the second pair of arms of the coupler.

57. A dual axis joint, comprising: a lug that defines a first bore therethrough and a second bore at least partially therethrough; a clevis comprising a pair of arms that define axially aligned bores therethrough; a coupler comprising a pair of arms disposed toward a first end of the coupler that define axially aligned bores therethrough, wherein a third bore is defined by the coupler toward a second end thereof, a first pin disposed within the bores defined by the pair of arms of the clevis and the first bore defined by the lug, wherein the first pin comprises an engagement surface formed on a portion of an external surface of the first pin between a first end and a second end thereof; a wedge disposed within the second bore defined by the lug, wherein the wedge comprises an engagement surface formed on a portion of an external surface of the wedge between a first end and a second end thereof, and wherein the engagement surface of the wedge contacts the engagement surface of the first pin thereby restricting relative movement between the first pin and the lug; and a second pin disposed within the bores defined by the clevis and the third bore defined by the coupler.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim can be not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation can be permitted.

While certain preferred embodiments of the present invention have been illustrated and described in detail above, it can be apparent that modifications and adaptations thereof will occur to those having ordinary skill in the art. It should be, therefore, expressly understood that such modifications and adaptations may be devised without departing from the basic scope thereof, and the scope thereof can be determined by the claims that follow.

What is claimed is:

1. A coupler configured to provide an articulated connection about two axes of rotation between a first member and a second member, comprising:
   a first end that defines a first bore therethrough and a second bore at least partially therethrough, wherein the first bore and the second bore partially intersect one another, and wherein a central axis through the first bore and a central axis through the second bore are substantially orthogonal to one another; and
   a second end that defines a third bore therethrough.

2. The coupler of claim 1, wherein the central axis through the first bore and a central axis through the third bore are substantially orthogonal to one another.

3. The coupler of claim 1, wherein the first end comprises a lug such that at least a portion of an inner surface of the first bore extending from a first end to a second end thereof is continuous, and wherein the second end comprises a lug such that at least a portion of an inner surface of the third bore extending from a first end to a second end thereof is continuous.

4. The coupler of claim 1, wherein the first end defines a groove that is substantially orthogonal to the central axis through the first bore.

5. The coupler of claim 4, wherein the groove partially intersects the first bore such that a portion of an inner surface of the first bore extending from a first end to a second end thereof that is opposite the partial intersection of the first and second bores is discontinuous.

6. The coupler of claim 1, wherein:
   the first bore is configured to receive a pin comprising an engagement surface formed on a portion of an external surface of the pin between a first end and a second end thereof, the second bore is configured to receive a wedge comprising an engagement surface formed on a portion of an external surface of the wedge between a first end and a second end thereof, and
   the partial intersection between the first bore and the second bore is configured to permit the engagement surface of the wedge to contact the engagement surface of the pin when the pin and the wedge are disposed within the first and second bores, respectively.

7. The coupler of claim 1, further comprising:
   a first pin disposed within the first bore of the coupler, wherein the first pin comprises an engagement surface formed on a portion of an external surface of the first pin between a first end and a second end thereof; and
   a first wedge disposed within the second bore of the coupler, wherein the first wedge comprises an engagement surface formed on a portion of an external surface of the first wedge between a first end and a second end thereof, and wherein the partial intersection between the first bore and the second bore of the coupler permits the engagement surface of the first wedge to contact the engagement surface of the first pin thereby restricting relative movement of the first pin within the first bore.

8. The coupler of claim 6, wherein:
   the third bore is configured to receive a second pin comprising an engagement surface formed on a portion of an external surface of the second pin between a first end and a second end thereof,
   the second end of the coupler further defines a fourth bore at least partially therethrough configured to receive a second wedge comprising an engagement surface formed on a portion of an external surface of the second wedge between a first end and a second end thereof,
   the third bore and the fourth bore partially intersect one another,
   a central axis through the third bore and a central axis through the fourth bore are substantially orthogonal to one another, and
   the partial intersection between the third bore and the fourth bore is configured to permit the engagement surface of the second wedge to contact the engagement surface of the second pin when the second pin and the second wedge are disposed within the third and fourth bores, respectively.

9. The coupler of claim 1, wherein the first end comprises a lug and the second end comprises a pair of arms, wherein the pair of arms define axially aligned bores therethrough such that the third bore is defined by the axially aligned bores, and wherein the lug defines the first bore therethrough and the second bore at least partially therethrough.

10. The coupler of claim 9, wherein at least a portion of an inner surface of the first bore extending from a first end to a second end thereof is continuous.

11. The coupler of claim 9, wherein the first end defines a groove that is substantially orthogonal to a central axis of the first bore.

12. The coupler of claim 11, wherein the groove partially intersects the first bore such that a portion of an inner surface of the first bore extending from a first end to a second end thereof that is opposite the partial intersection of the first and second bores is discontinuous.

13. The coupler of claim 9, wherein:
   the first bore is configured to receive a first pin comprising an engagement surface formed on a portion of an external surface of the first pin between a first end and a second end thereof, the second bore is configured to receive a first wedge comprising an engagement surface formed on a portion of an external surface of the first wedge between a first end and a second end thereof, and the partial intersection between the first bore and the second bore is configured to permit the engagement surface of the first wedge to contact the engagement surface of the first pin when the first pin and the first wedge are disposed within the first and second bores, respectively.

14. The coupler of claim 9, further comprising:

a first pin disposed within the first bore of the coupler, wherein the first pin comprises an engagement surface formed on a portion of an external surface of the first pin between a first end and a second end thereof; and a first wedge disposed within the second bore of the coupler, wherein the first wedge comprises an engagement surface formed on a portion of an external surface of the first wedge between a first end and a second end thereof, and wherein the partial intersection between the first bore and the second bore of the coupler permits the engagement surface of the first wedge to contact the engagement surface of the first pin thereby restricting relative movement of the first pin within the first bore.

15. The coupler of claim 1, wherein:

a body of the coupler is disposed between the first and second ends of the coupler, the first end of the coupler comprises a first pair of arms and the second end of the coupler comprises a second pair of arms, the first pair of arms define axially aligned bores therethrough such that the first bore is defined by the axially aligned bores of the first pair of arms and a portion of the body of the coupler, the body of the coupler at least partially defines the second bore, and the second pair of arms define axially aligned bores therethrough such that the third bore is defined by the axially aligned bores of the second pair of arms.

16. The coupler of claim 15, further comprising a lug that defines a first bore therethrough and a second bore at least partially therethrough, wherein:

a central axis through the first bore defined by the lug and a central axis through the second bore defined by the lug are substantially orthogonal to one another, the first and second bores defined by the lug partially intersect one another, the first bore defined by the lug and the third bore defined by the second pair of arms are each configured to receive a pin comprising an engagement surface formed on a portion of an external surface of the pin between a first end and a second end thereof, the second bore defined by the lug is configured to receive a wedge comprising an engagement surface formed on a portion of an external surface of the wedge between a first end and a second end thereof, and the partial intersection between the first bore defined by the lug and the second bore defined by the lug is configured to permit the engagement surface of the wedge to contact the engagement surface of the pin when the pin and the wedge are disposed within the first and second bores defined by the lug, respectively.

17. The coupler of claim 1, wherein the coupler is a single unitary structural member.

18. The coupler of claim 1, wherein:

the central axis through the first bore lies in a first plane and the central axis through the second bore line lies in a second plane, the first plane and the second plane are parallel with respect to one another, and the central axis through the first bore and the central axis through the second bore are oriented at substantially 90 degrees with respect to one another when viewed along an axis that is normal to the first and second planes.

19. A dual axis joint, comprising:

a coupler comprising a lug disposed at a first end thereof and a pair of arms disposed at a second end thereof, wherein the lug defines a first bore therethrough and a second bore at least partially therethrough, wherein the first bore and the second bore defined by the lug partially intersect one another, and wherein the pair of arms define a pair of axially aligned bores therethrough;

a first pin disposed within the first bore, wherein the first pin comprises an engagement surface formed on a portion of an external surface of the first pin between a first end and a second end thereof;

a first wedge disposed within the second bore, wherein the first wedge comprises an engagement surface formed on a portion of an external surface of the first wedge between a first end and a second end thereof, and wherein the engagement surface of the first wedge contacts the engagement surface of the first pin thereby restricting relative movement between the first pin and the coupler;

an arm defining a first bore therethrough and a second bore at least partially therethrough, wherein the first bore and the second bore defined by the arm partially intersect one another, and wherein the first bore defined by the arm and the second bore defined by the arm are disposed toward a first end of the arm;

a second pin disposed within the pair of axially aligned bores defined by the pair of arms of the coupler and the first bore defined by the arm, wherein the second pin comprises an engagement surface formed on a portion of an external surface of the second pin between a first end and a second end thereof; and a second wedge disposed within the second bore defined by the arm, wherein the second wedge comprises an engagement surface formed on a portion of an external surface of the second wedge between a first end and a second end thereof, and wherein the engagement surface of the second wedge contacts the engagement surface of the second pin thereby restricting relative movement between the second pin and the arm.

20. The dual axis joint of claim 19, wherein a central axis through the first bore defined by the lug and a central axis through the pair of axially aligned bores defined by the pair of arms are substantially orthogonal to one another, and wherein the central axis through the first bore defined by the lug and a central axis through the second bore defined by the lug are substantially orthogonal to one another.

21. The dual axis joint of claim 20, wherein:

the central axis through the first bore lies in a first plane and the central axis through the second bore lies in a second plane, the first plane and the second plane are parallel with respect to one another, and the central axis through the first bore and the central axis through the second bore are oriented at substantially 90 degrees with respect to one another when viewed along an axis that is normal to the first and second planes.

22. The dual axis joint of claim 19, wherein a central axis through the first bore of the arm and a central axis through the second bore of the arm are substantially orthogonal to one another.

23. The dual axis joint of claim 19, wherein the first end of the lug defines a groove that is substantially orthogonal to a central axis of the first bore.

24. The dual axis joint of claim 19, wherein the coupler is a single unitary structural member.

\* \* \* \* \*